United States Patent
Nagashima et al.

(10) Patent No.: US 12,194,927 B2
(45) Date of Patent: Jan. 14, 2025

(54) GLASS FOR VEHICLES AND CAMERA UNIT

(71) Applicant: AGC Inc., Tokyo (JP)

(72) Inventors: Tatsuo Nagashima, Chiyoda-ku (JP); Yutaka Kitajima, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 362 days.

(21) Appl. No.: 17/804,929

(22) Filed: Jun. 1, 2022

(65) Prior Publication Data
US 2022/0289121 A1     Sep. 15, 2022

Related U.S. Application Data

(63) Continuation of application No. PCT/JP2020/044935, filed on Dec. 2, 2020.

(30) Foreign Application Priority Data
Dec. 6, 2019   (JP) .................................. 2019-221472

(51) Int. Cl.
*B60R 11/04*      (2006.01)
*B60J 1/02*       (2006.01)
*G02B 1/11*       (2015.01)

(52) U.S. Cl.
CPC ................. *B60R 11/04* (2013.01); *B60J 1/02* (2013.01); *G02B 1/11* (2013.01)

(58) Field of Classification Search
CPC ............... B60R 11/04; B60J 1/02; G02B 1/11
(Continued)

(56) References Cited

U.S. PATENT DOCUMENTS 10,336,163 B2    7/2019   Sakamoto et al.
2003/0169491 A1*   9/2003   Bender .................... H04N 5/33
                                                    359/356
(Continued)

FOREIGN PATENT DOCUMENTS

CN       101037099 A     9/2007
CN       106103158 A     11/2016
(Continued)

OTHER PUBLICATIONS

International Search Report issued Feb. 22, 2021 in PCT/JP2020/044935, filed Dec. 2, 2020, 3 pages.

*Primary Examiner* — Matthew David Kim
(74) *Attorney, Agent, or Firm* — Oblon, McClelland, Maier & Neustadt, L.L.P.

(57) ABSTRACT

Glass (1) for vehicles includes a light blocking region (A2) in which a far-infrared ray transmission region (B) provided with an opening and a far-infrared ray transmission member arranged in the opening, and a visible light transmission region (C) transmitting visible light are formed. The opening is formed between an upper edge part (1a) of the glass (1) and a first position (P1) in a first direction from the upper edge part (1a) toward a lower edge part (1b) of the glass (1), the first position (P1) is a position at which a distance from the upper edge part (1a) is 30% of a length from the upper edge part (1a) to the lower edge part (1b), and between a second position (P2) and a third position (P3) in a second direction from a side edge part (1c) toward a side edge part (1d) of the glass (1) for vehicles. A length (L2a) in the second direction from the second position (P2) to the third position (P3) is 55% of a length (L2) from the side edge part (1c) to the side edge part (1d), and a length of the longest straight line among straight lines connecting optional two (Continued)

points within a surface on a vehicle exterior side is equal to or smaller than 80 mm.

17 Claims, 15 Drawing Sheets

(58) Field of Classification Search
USPC .......................................................... 348/118
See application file for complete search history.

(56) References Cited

U.S. PATENT DOCUMENTS

| | | | | |
|---|---|---|---|---|
| 2007/0216768 | A1* | 9/2007 | Smith | B60R 11/04 348/118 |
| 2012/0327674 | A1* | 12/2012 | Stakoe | B60J 3/0282 362/492 |
| 2014/0327958 | A1* | 11/2014 | Yoshimura | B32B 27/32 359/359 |
| 2017/0015180 | A1* | 1/2017 | Sakamoto | B32B 17/10761 |
| 2017/0217290 | A1* | 8/2017 | Yoshizumi | G09F 21/049 |
| 2019/0022981 | A1* | 1/2019 | Labrot | G09F 3/203 |
| 2019/0263403 | A1* | 8/2019 | Choi | B60W 30/146 |
| 2019/0337513 | A1* | 11/2019 | Kim | B60W 30/12 |
| 2020/0254877 | A1* | 8/2020 | Nakajima | B32B 17/10036 |
| 2021/0183943 | A1* | 6/2021 | Mori | H01L 27/156 |
| 2021/0316532 | A1* | 10/2021 | Nakayama | C03C 3/087 |

FOREIGN PATENT DOCUMENTS

| | | | | |
|---|---|---|---|---|
| GB | 2 271 139 | A | 4/1994 | |
| JP | 5-193668 | A | 8/1993 | |
| JP | 2000-318513 | A | 11/2000 | |
| JP | 2005-234694 | A | 9/2005 | |
| JP | 2008-236062 | A | 10/2008 | |
| JP | 2015-175745 | A | 10/2015 | |
| JP | 2018-119856 | A | 8/2018 | |
| WO | WO 2015/137518 | A1 | 9/2015 | |
| WO | WO-2015170771 | A1 * | 11/2015 | ........ B32B 17/10036 |
| WO | WO 2016/088472 | A1 | 6/2016 | |
| WO | WO 2019/147605 | A1 | 8/2019 | |

* cited by examiner

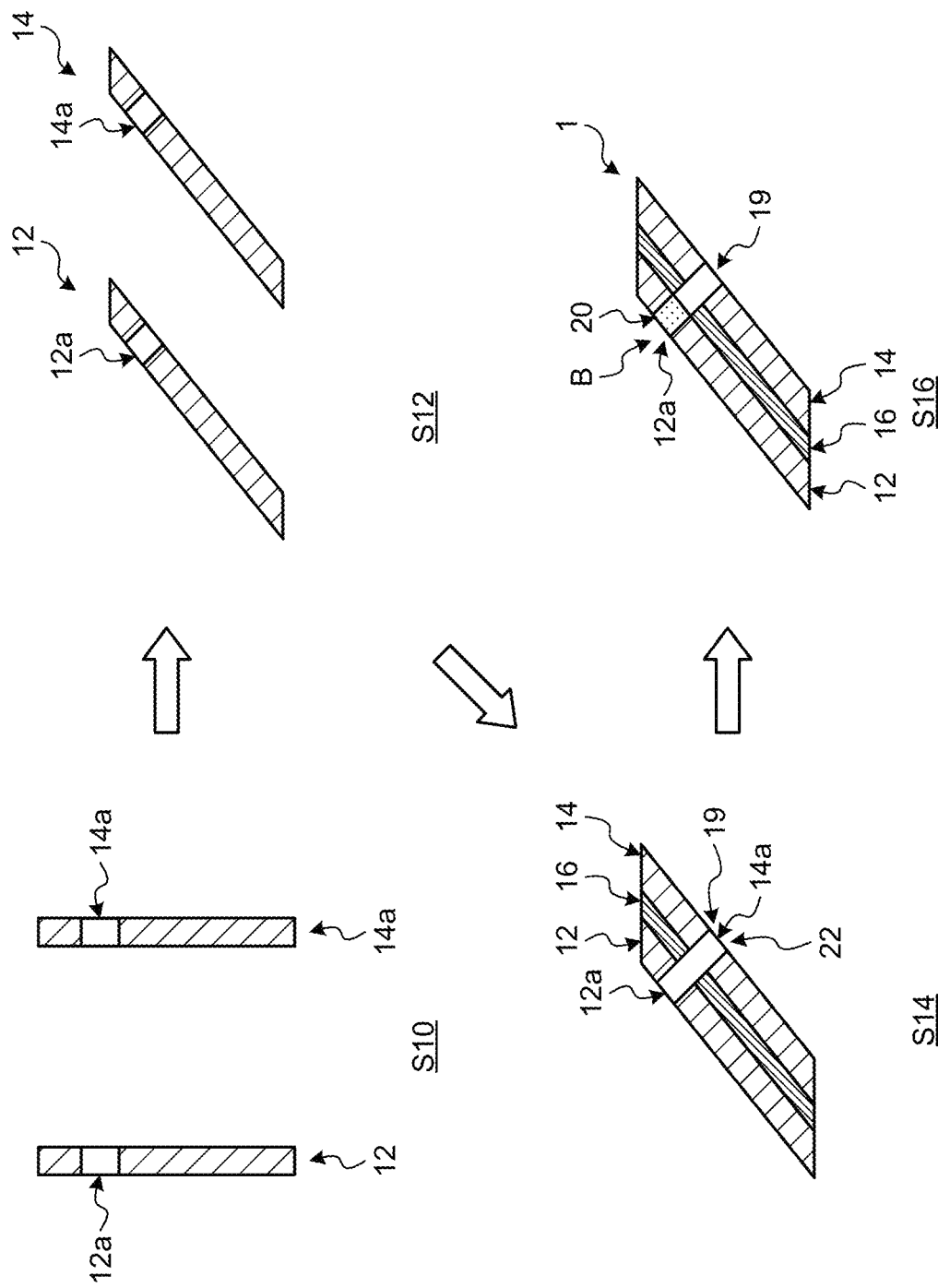

FIG.16

| | EXAMPLE 1 | | | EXAMPLE 2 | | | EXAMPLE 3 | | |
|---|---|---|---|---|---|---|---|---|---|
| | DIAMETER | CENTER POSITION | | DIAMETER | CENTER POSITION | | DIAMETER | CENTER POSITION | |
| | 50 mm | (12.8, 21.7) | | 50 mm | (31.3, 21.7) | | 50 mm | (62.5, 21.7) | |
| OPENING POSITION | | | | | | | | | |
| ENTIRE HIGHLIGHT | | | | | | | | | |
| ENLARGED HIGHLIGHT OPENING | | | | | | | | | |
| PERSPECTIVE DISTORTION AMOUNT | 0.13 | | | 0.17 | | | 0.29 | | |

| | EXAMPLE 4 | | | EXAMPLE 5 | | | EXAMPLE 6 | | |
|---|---|---|---|---|---|---|---|---|---|
| | DIAMETER | CENTER POSITION | | DIAMETER | CENTER POSITION | | DIAMETER | CENTER POSITION | |
| | 75 mm | (15.0, 21.7) | | 100 mm | (17.2, 21.7) | | - | - | |
| OPENING POSITION | | | | | | | | | |
| ENTIRE HIGHLIGHT | | | | | | | | | |
| ENLARGED HIGHLIGHT OPENING | | | | | | | | | |
| PERSPECTIVE DISTORTION AMOUNT | 0.19 | | | 0.23 | | | - | | |

GLASS FOR VEHICLES AND CAMERA UNIT

CROSS-REFERENCE TO RELATED APPLICATION(S)

This application is a continuation of International Application No. PCT/JP2020/044935, filed on Dec. 2, 2020, the entire contents of which are incorporated herein by reference.

FIELD

The present invention relates to glass for vehicles and a camera unit.

BACKGROUND

In recent years, various sensors may be mounted for the purpose of improving safety of an automobile. Examples of the sensor mounted on the automobile include a camera, Light Detecting and Ranging (LiDAR), a millimetric wave radar, an infrared sensor, or the like.

Infrared rays are classified into near-infrared (for example, a wavelength of 0.7 μm to 2 μm), mid-infrared (for example, a wavelength of 3 μm to 5 μm), and far-infrared (for example, a wavelength of 8 μm to 13 μm) depending on a wavelength band thereof. Examples of the infrared sensor for detecting such infrared rays include a touch sensor, a near-infrared camera, or a LiDAR for near-infrared, gas analysis or mid-infrared spectroscopic analysis (functional group analysis) for mid-infrared, night vision or a thermoviewer (hereinafter, referred to as a far-infrared camera) for far-infrared, and the like.

Normally, window glass of an automobile does not transmit far-infrared rays having a wavelength from 8 μm to 13 μm, so that a far-infrared camera is conventionally installed outside a compartment, more specifically, on a front grill in many cases as in Patent Literature 1, for example. However, in a case of installing the far-infrared camera outside the compartment, a structure becomes more complicated to secure ruggedness, water resistance, dustproof properties, and the like, which results in high cost. By installing the far-infrared camera within the compartment, specifically, in an operation area of wipers, the far-infrared camera is protected by the window glass, so that the problem as described above can be solved. However, as described above, there is the problem that far-infrared ray transmittance of the window glass is low, so that the far-infrared camera has not been disposed within the compartment normally.

To meet the demand described above, Patent Literature 2 discloses a window member in which a through hole is made on part of the window glass and an infrared-ray transmissive member is filled in the through hole.

CITATION LIST

Patent Literature

Patent Literature 1: U.S. Unexamined Patent Application Publication No. 2003/0169491
Patent Literature 2: U.K. Unexamined Patent Application Publication No. 2271139

SUMMARY

Technical Problem

In a case of making the through hole on the window glass to fill the infrared-ray transmissive member therein as in Patent Literature 2, a position and a size of the through hole needs to be appropriately set. Particularly, in a case of mounting a visible light camera in addition to the far-infrared camera, visibility of the visible light camera may be hindered when optical distortion occurs in the periphery of the through hole, so that a setting of the position and the size of the through hole is important. Thus, for the glass for vehicles in which the through hole is made and the infrared-ray transmissive member is filled therein, there is a demand for suppressing lowering of visibility of the visible light camera.

The present invention is made in view of such a situation, and provides glass for vehicles and a camera unit that can suppress lowering of visibility of a visible light camera.

Solution to Problem

To solve the problem above, a glass for vehicles of the present disclosure comprises a light blocking region, wherein a far-infrared ray transmission region provided with an opening and a far-infrared ray transmission member arranged in the opening, and a visible light transmission region transmitting visible light are formed in the light blocking region. The opening is formed between an upper edge part of the glass and a first position in a first direction from the upper edge part toward a lower edge part of the glass, the first position is a position at which a distance from the upper edge part is 30% of a length from the upper edge part to the lower edge part, and formed between a second position and a third position in a second direction from one side edge part toward another side edge part of the glass, the second position is closer to the one side edge part than a center of the glass, and the third position is closer to the other side edge part than the center of the glass and a distance from the center is equal to that of the second position, wherein a length from the second position to the third position in the second direction is 55% of a length from the one side edge part to the other side edge part, and a length of the longest straight line among straight lines connecting optional two points within a surface on a vehicle exterior side of the opening is equal to or smaller than 80 mm.

To solve the problem above, a camera unit of the present disclosure comprises the glass for vehicles; a far-infrared camera; and a visible light camera, wherein the far-infrared camera is mounted on the glass for vehicles so as to be able to take a thermal image of the outside through the far-infrared ray transmission region, and the visible light camera is mounted on the glass for vehicles so as to be able to take an image of the outside through the visible light transmission region.

Advantageous Effects of Invention

According to the present invention, it is possible to suppress lowering of visibility of a visible light camera.

BRIEF DESCRIPTION OF DRAWINGS

FIG. 15 is a schematic diagram for explaining an example of a manufacturing method for glass for vehicles according to the present embodiment.

FIG. 16 is a diagram illustrating an analysis result of a perspective distortion amount in the periphery of an opening in a case of changing a position and a size of the opening.

DESCRIPTION OF EMBODIMENTS

The following describes a preferred embodiment of the present invention in detail with reference to the attached drawings. The present invention is not limited to the embodiment, and in a case in which there are a plurality of embodiments, the embodiments may be combined with each other. Numerical values encompass rounded numerical values.

(Vehicle)

Figure 1:
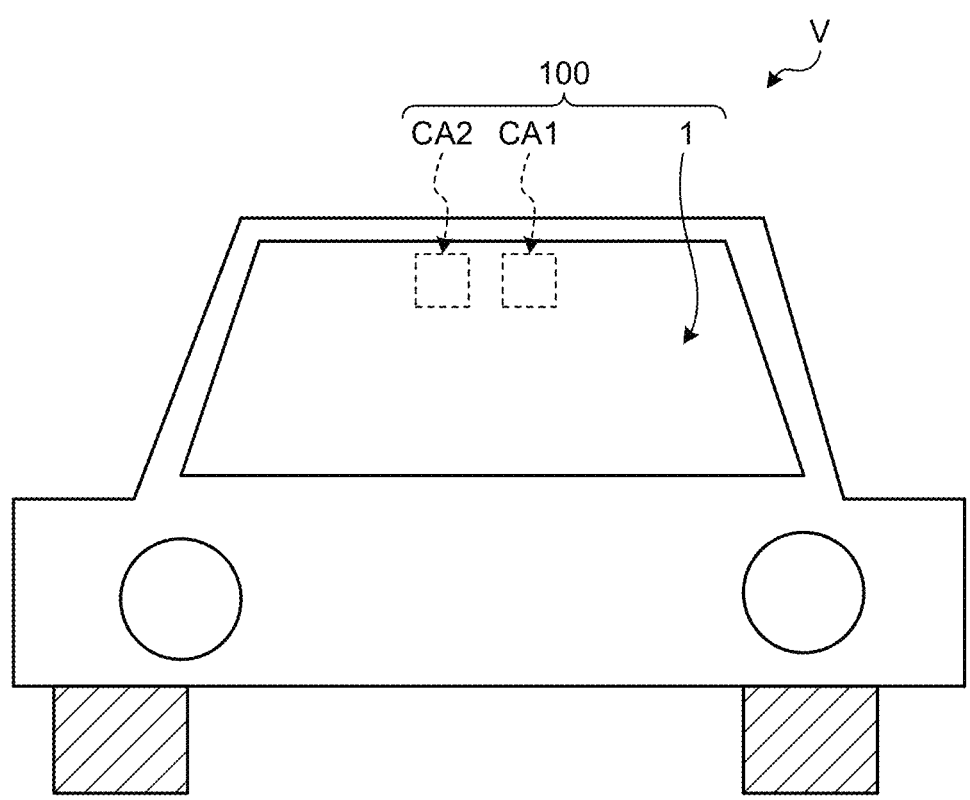
FIG. 1 is a schematic diagram illustrating a state in which glass for vehicles according to a present embodiment is mounted on a vehicle.

FIG. 1 is a schematic diagram illustrating a state in which glass for vehicles according to the present embodiment is mounted on a vehicle. As illustrated in FIG. 1, glass 1 for vehicles according to the present embodiment is mounted on a vehicle V. The glass 1 for vehicles is a window member applied to a windshield of the vehicle V. That is, the glass 1 for vehicles is used as a front window of the vehicle V, in other words, wind shield glass. A far-infrared camera CA1 and a visible light camera CA2 are mounted inside the vehicle V (within the vehicle). The inside of the vehicle V (within the vehicle) indicates the inside of a compartment in which a driver's seat of a driver is disposed, for example. The glass 1 for vehicles, the far-infrared camera CA1, and the visible light camera CA2 constitute a camera unit 100 according to the present embodiment. The far-infrared camera CA1 is a camera that detects far-infrared rays, and takes a thermal image of the outside of the vehicle V by detecting far-infrared rays from the outside of the vehicle V. The visible light camera CA2 is a camera that detects visible light, and takes an image of the outside of the vehicle V by detecting visible light from the outside of the vehicle V. The camera unit 100 may further include a LiDAR or a millimetric wave radar, for example, in addition to the far-infrared camera CA1 and the visible light camera CA2. Herein, the far-infrared ray is an electromagnetic wave in a wavelength band having a wavelength from 8 μm to 13 μm, for example, and the visible light is an electromagnetic wave in a wavelength band having a wavelength from 360 nm to 830 nm, for example. Herein, "8 μm to 13 μm" and "360 nm to 830 nm" respectively indicates "equal to or larger than 8 μm and equal to or smaller than 13 μm" and "equal to or larger than 360 nm and equal to or smaller than 830 nm", and the same applies to the following.

(Glass for Vehicles)

Figure 2:
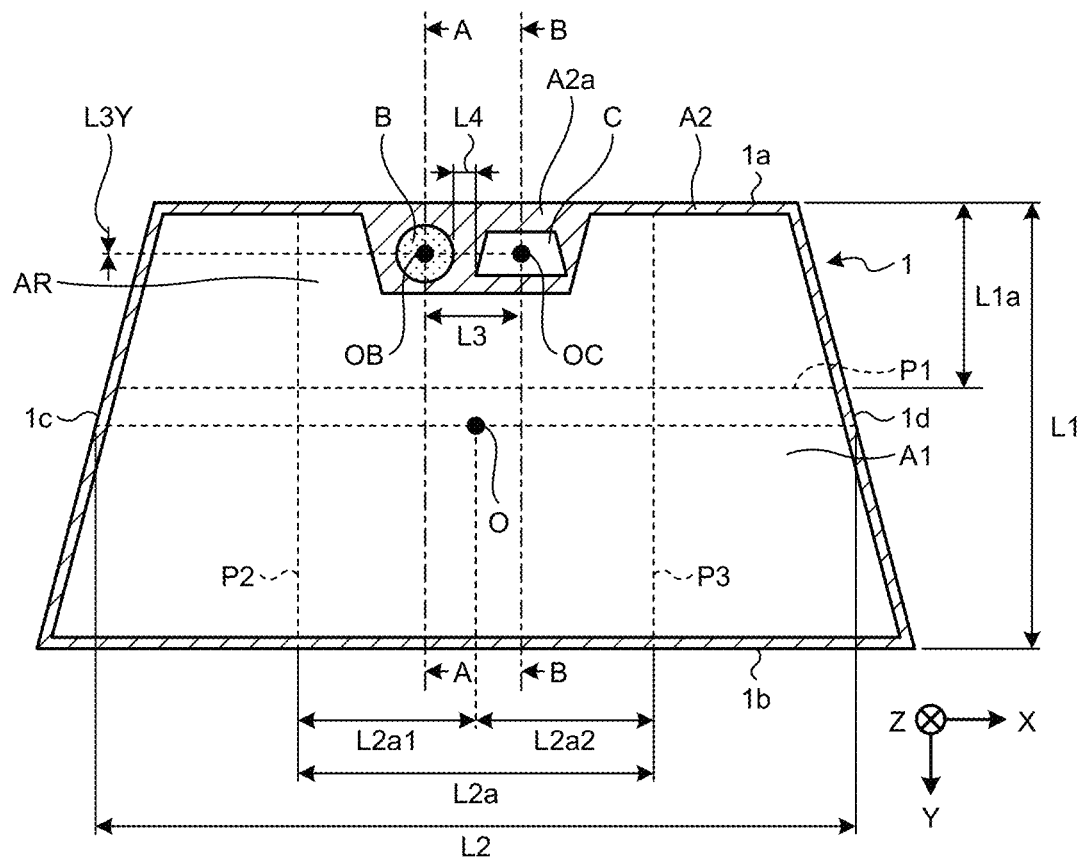
FIG. 2 is a schematic plan view of the glass for vehicles according to the present embodiment.
Figure 3:
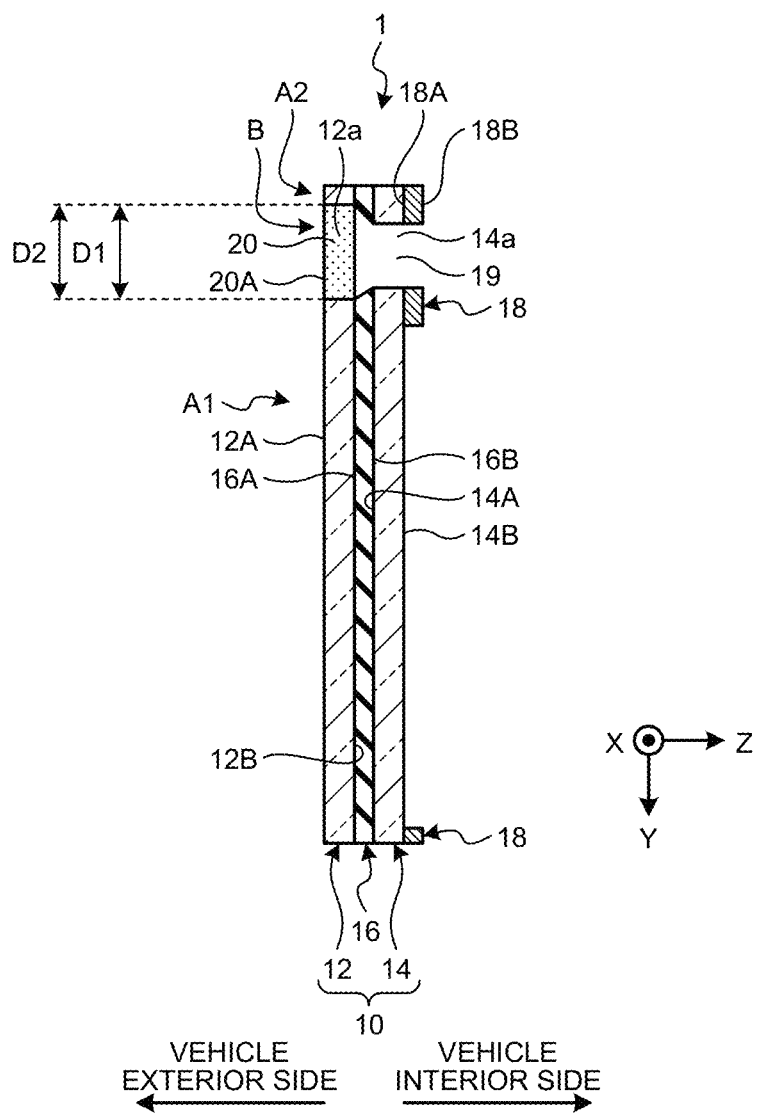
FIG. 3 is a cross-sectional view along the line A-A in FIG. 2.
Figure 4:
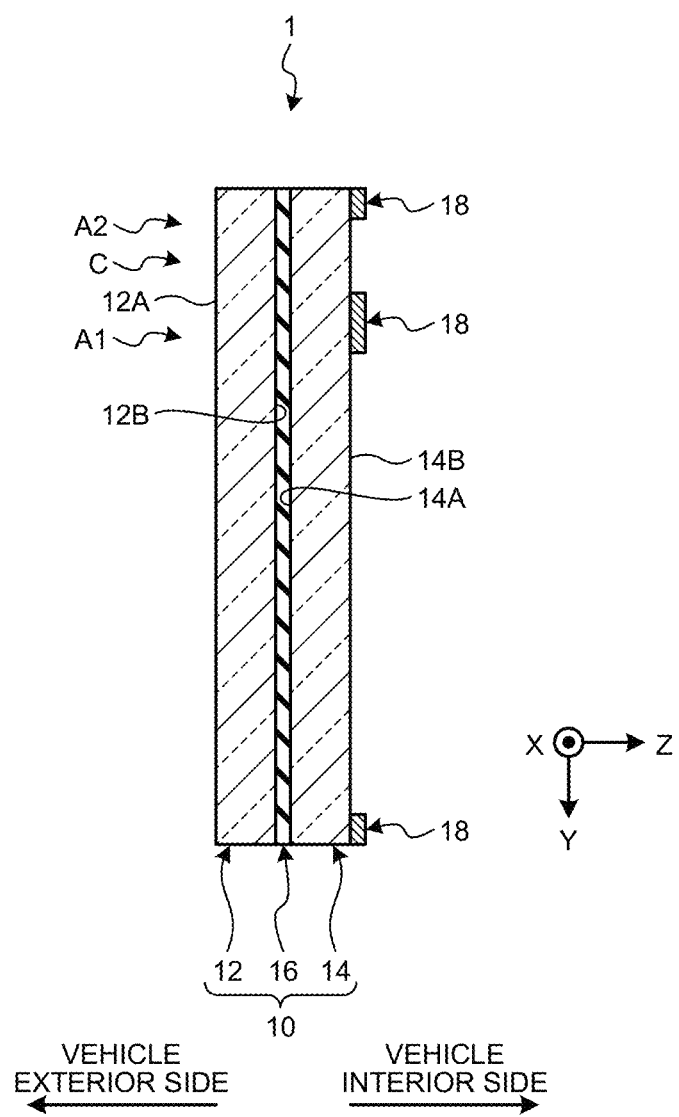
FIG. 4 is a cross-sectional view along the B-B cross section in FIG. 2.

FIG. 2 is a schematic plan view of the glass for vehicles according to the present embodiment, FIG. 3 is a cross-sectional view along the line A-A in FIG. 2, and FIG. 4 is a cross-sectional view along the B-B cross section in FIG. 2. As illustrated in FIG. 2, an upper edge of the glass 1 for vehicles is assumed to be an upper edge part 1a, a lower edge thereof is assumed to be a lower edge part 1b, one side edge is assumed to be a side edge part 1c, and the other side edge is assumed to be a side edge part 1d hereinafter. The upper edge part 1a is an edge portion that is positioned on an upper side in a vertical direction when the glass 1 for vehicles is mounted on the vehicle V, and the lower edge part 1b is an edge portion that is positioned on a lower side in the vertical direction when the glass 1 for vehicles is mounted on the vehicle V. The side edge part 1c is an edge portion that is positioned on one lateral side when the glass 1 for vehicles is mounted on the vehicle V, and the side edge part 1d is an edge portion that is positioned on the other lateral side when the glass 1 for vehicles is mounted on the vehicle V. Hereinafter, among directions parallel to a surface of the glass 1 for vehicles, a direction from the upper edge part 1a toward the lower edge part 1b is assumed to be a Y-direction (first direction), and a direction from the side edge part 1c toward the side edge part 1d is assumed to be an X-direction. The X-direction is orthogonal to the Y-direction in the present embodiment. Additionally, a direction orthogonal to the surface of the glass 1 for vehicles, that is, a thickness direction of the glass 1 for vehicles is assumed to be a Z-direction. The Z-direction is, for example, a direction from a vehicle exterior side toward a vehicle interior side of the vehicle V when the glass 1 for vehicles is mounted on the vehicle V. The X-direction and the Y-direction run along the surface of the glass 1 for vehicles. However, in a case in which the surface of the glass 1 for vehicles is a curved surface, for example, the X-direction and the Y-direction may be directions being in contact with the surface of the glass 1 for vehicles at a center point O of the glass 1 for vehicles. The center point O is a center position of the glass 1 for vehicles in a case of viewing the glass 1 for vehicles from the Z-direction.

A transparent region A1 and a light blocking region A2 are formed on the glass 1 for vehicles. The transparent region A1 is a region occupying a center portion of the glass 1 for vehicles when viewed from the Z-direction, and is a region for securing a visual field of the driver. The transparent region A1 is a region that transmits visible light. The light blocking region A2 is a region formed in the periphery of the transparent region A1 when viewed from the Z-direction. The light blocking region A2 is a region that blocks visible light. In the light blocking region A2, a far-infrared ray transmission region B and a visible light transmission region C are formed within a light blocking region A2a as a portion on the upper edge part 1a side. The far-infrared ray transmission region B is a region that transmits far-infrared rays, and is a region in which the far-infrared camera CA1 is disposed. That is, the far-infrared camera CA1 is disposed at a position overlapping the far-infrared ray transmission region B when viewed from an optical axis direction of the far-infrared camera CA1. The visible light transmission region C is a region that transmits visible light, and is a region in which the visible light camera CA2 is disposed. That is, the visible light camera CA2 is disposed at a position overlapping the visible light transmission region C when viewed from an optical axis direction of the visible light camera CA2. In this way, the far-infrared ray transmission region B and the visible light transmission region C are formed in the light blocking region A2, so that it can be said that the light blocking region A2 blocks far-infrared rays in a region other than a region in which the far-infrared ray transmission region B is formed, and blocks visible light in a region other than a region in which the visible light transmission region C is formed. It can also be said that the light blocking region A2a is formed in the periphery of the far-infrared ray transmission region B and the visible light transmission region C. When the light blocking region A2a is disposed in the periphery, various sensors are preferably protected from sunlight. Additionally, this configuration prevents wiring of various sensors from being viewed from the outside of the vehicle, so that the configuration is preferable also in view of design. Detailed description about the far-infrared ray transmission region B and the visible light transmission region C will be described later.

As illustrated in FIG. 3, the glass 1 for vehicles includes a glass base body 12, a glass base body 14, an intermediate layer 16, and a light blocking layer 18. In the glass 1 for vehicles, the glass base body 12, the intermediate layer 16, the glass base body 14, and the light blocking layer 18 are laminated in this order in the Z-direction. The glass base body 12 and the glass base body 14 are fixed (bonded) to each other via the intermediate layer 16. As the glass base bodies 12 and 14, for example, soda-lime glass, borosilicate glass, aluminosilicate glass, or the like may be used. The intermediate layer 16 is a bonding layer that bonds the glass base body 12 to the glass base body 14. As the intermediate layer 16, for example, a polyvinyl butyral (hereinafter, also referred to as PVB) modified material, an ethylene-vinyl acetate copolymer (EVA) based material, a urethane resin material, a vinyl chloride resin material, or the like can be used. More specifically, the glass base body 12 includes one surface 12A and another surface 12B, and the other surface 12B is in contact with one surface 16A of the intermediate layer 16 to be fixed (bonded) to the intermediate layer 16. Additionally, the glass base body 14 includes one surface 14A and another surface 14B, and the one surface 14A is in contact with another surface 16B of the intermediate layer 16 to be fixed (bonded) to the intermediate layer 16. As described above, the glass 1 for vehicles is laminated glass in which the glass base body 12 and the glass base body 14 are laminated. However, the glass 1 for vehicles is not limited to the laminated glass, and may include only one of the glass base body 12 and the glass base body 14, for example. In this case, the intermediate layer 16 is not required to be disposed. Hereinafter, in a case of not distinguishing between the glass base bodies 12 and 14, they are referred to as a glass base body 10.

The light blocking layer 18 includes one surface 18A and another surface 18B, and the one surface 18A is in contact with the other surface 14B of the glass base body 14 to be fixed. The light blocking layer 18 is a layer that blocks visible light. As the light blocking layer 18, for example, a ceramics light blocking layer or a light blocking film can be used. As the ceramics light blocking layer, for example, a ceramics layer made of a conventionally known material such as a black ceramics layer (also known as "the black enamel") can be used. As the light blocking film, for example, a light blocking polyethylene terephthalate (PET) film, a light blocking polyethylene naphthalate (PEN) film, a light blocking polymethyl methacrylate (PMMA) film, or the like can be used.

In the present embodiment, in the glass 1 for vehicles, a side on which the light blocking layer 18 is disposed is an inner side of the vehicle V (vehicle interior side), and the glass base body 12 is disposed on an outer side of the vehicle V (vehicle exterior side). However, the embodiment is not limited thereto, and the light blocking layer 18 may be disposed on the outer side of the vehicle V. In a case in which the glass 1 for vehicles is configured by the laminated glass of the glass base bodies 12 and 14, the light blocking layer 18 may be formed between the glass base body 12 and the glass base body 14.

The light blocking region A2 is formed by disposing the light blocking layer 18 on the glass base body 10. That is, the light blocking region A2 is a region in which the glass base body 10 includes the light blocking layer 18. That is, it can be said that the light blocking region A2 is a region in which the glass base body 12, the intermediate layer 16, the glass base body 14, and the light blocking layer 18 are laminated. On the other hand, the transparent region A1 is a region in which the glass base body 10 does not include the light blocking layer 18. That is, it can be said that the transparent region A1 is a region in which the glass base body 12, the intermediate layer 16, and the glass base body 14 are laminated, but the light blocking layer 18 is not laminated.

As illustrated in FIG. 4, the visible light transmission region C is a region in which the glass base body 10 does not include the light blocking layer 18 in the Z-direction similarly to the transparent region A1. That is, it can be said that the visible light transmission region C is a region in which the glass base body 12, the intermediate layer 16, and the glass base body 14 are laminated, but the light blocking layer 18 is not laminated.

As illustrated in FIG. 3, an opening 19 is formed on the glass 1 for vehicles, the opening 19 passing through one surface (the surface 12A herein) and the other surface (the surface 14B herein) in the Z-direction. In the opening 19, a far-infrared ray transmission member 20 is disposed. A region in which the opening 19 is formed and the far-infrared ray transmission member 20 is disposed is the far-infrared ray transmission region B. That is, the far-infrared ray transmission region B is the region in which the opening 19 and the far-infrared ray transmission member 20 arranged in the opening 19 are disposed. Additionally, the light blocking layer 18 is also not disposed in the far-infrared ray transmission region B. That is, in the far-infrared ray transmission region B, the glass base body 12, the intermediate layer 16, the glass base body 14, and the light blocking layer 18 are not disposed, and the far-infrared ray transmission member 20 is disposed in the opening 19 formed therein.

Regarding the far-infrared ray transmission member 20, an average transmittance of far-infrared rays having a wavelength from 8 to 13 µm is preferably equal to or larger than 25%, more preferably equal to or larger than 40%, even more preferably equal to or larger than 50%, yet more preferably equal to or larger than 70%, and especially preferably equal to or larger than 85%. Additionally, regarding the far-infrared ray transmission member 20, the average transmittance of far-infrared rays having a wavelength from 8 to 13 μm is preferably equal to or smaller than 100%. To improve the average transmittance of far-infrared rays to be equal to or larger than 85%, an antireflection film is preferably disposed. When the average transmittance of far-infrared rays falls within this numerical range, far-infrared rays can be appropriately transmitted, and performance of the far-infrared camera CA1 can be sufficiently exhibited.

A material of the far-infrared ray transmission member 20 is not particularly limited, and examples thereof include ZnS, Ge, Si, or chalcogenide glass. Preferred composition of the chalcogenide glass contains, in atomic percentage, Ge+Ga; 7% to 25%,
Sb; 0% to 35%,
Bi; 0% to 20%,
Zn; 0% to 20%,
Sn; 0% to 20%,
Si; 0% to 20%,
La; 0% to 20%,
S+Se+Te; 55% to 80%,
Ti; 0.005% to 0.3%,
Li+Na+K+Cs; 0% to 20%, and
F+Cl+Br+I; 0% to 20%. Additionally, this glass preferably has a glass transition point (Tg) of 140° C. to 550° C.

A method of attaching the far-infrared ray transmission member 20 to the opening 19 is not particularly limited, but the far-infrared ray transmission member 20 can be attached to the opening 19 with a bonding agent such as a urethane-based bonding agent and/or an acrylic-based bonding agent, for example. Typically, a thermal expansion difference between the window glass of the automobile and the far-infrared ray transmission member is large, so that it is preferable to select a bonding agent that can reduce the thermal expansion difference and is excellent in bonding strength, shock resistance, and environmental resistance. To improve environmental resistance, a bonding surface on the vehicle exterior side may be protected by resin and the like.

A gap of 0.2 mm to 1.5 mm may be preferably disposed between the far-infrared ray transmission member 20 and the opening 19. Herein, the gap means a distance between an inner peripheral surface of the opening 19 and an outer peripheral surface of the far-infrared ray transmission member 20. By setting the gap to be equal to or larger than 0.2 mm, it is possible to appropriately prevent the glass 1 for vehicles from being optically distorted, or prevent at least one of the glass 1 for vehicles and the far-infrared ray transmission member 20 from being damaged, due to the thermal expansion difference between the glass base body 10 and the far-infrared ray transmission member 20. Additionally, by setting the gap to be equal to or smaller than 1.5 mm, the bonding strength and the shock resistance of the far-infrared ray transmission member 20 can be appropriately maintained. This gap is more preferably equal to or larger than 0.3 mm, yet more preferably equal to or larger than 0.5 mm, more preferably equal to or smaller than 1.2 mm, and yet more preferably equal to or smaller than 1.0 mm.

A surface on the vehicle exterior side of the far-infrared ray transmission member 20 is preferably formed to be flush with (continuous to) a surface on the vehicle exterior side of the light blocking region A2. In other words, the surface 20A on the vehicle exterior side of the far-infrared ray transmission member 20 is formed to be continuous to the surface 12A of the glass base body 12. In this way, when the surface 20A of the far-infrared ray transmission member 20 is continuous to the surface 12A of the glass base body 12, a wiping effect of the wipers can be prevented from being deteriorated. Furthermore, it is possible to prevent the design of the vehicle V from being deteriorated due to a level difference, and prevent dust and the like from accumulating on the level difference. Additionally, the far-infrared ray transmission member 20 is preferably shaped in accordance with a curved surface shape of the glass 1 for vehicles to be applied. A method of shaping the far-infrared ray transmission member 20 is not particularly limited, but polishing or mold molding is selected in accordance with the curved surface shape or a member.

Coating may be applied to the surface on the vehicle exterior side or the surface on the vehicle interior side of the far-infrared ray transmission member 20. For example, an antireflection film may be provided on the surface on the vehicle exterior side (surface 20A). More specifically, the far-infrared ray transmission member 20 may include the antireflection film on at least one of the surface on the vehicle exterior side and the surface on the vehicle interior side, in other words, on the surface on the vehicle exterior side, the surface on the vehicle interior side, or both surfaces on the vehicle exterior side and the vehicle interior side. The antireflection film is preferably an antireflection film including 1 to 12 layers, and more preferably an antireflection film including 3 to 12 layers. A material thereof is not particularly limited, but is preferably Ge, Si, ZnS, ZnSe, $As_2S_3$, $As_2Se_3$, metal oxide ($Al_2O_3$, $Bi_2O_3$, $CeO_2$, CuO, $HfO_2$, MgO, SiO, $SiO_2$, TiO, $TiO_2$, $Ti_2O_3$, $Y_2O_3$, $ZrO_2$) carbon hydride, diamond-like carbon (DLC), or metal fluoride ($MgF_2$, $CaF_2$, $SrF_2$, $BaF_2$, $PbF_2$, $LaF_3$, $YF_3$). A layer closest to the vehicle exterior side of the antireflection film is preferably a film having Mohs hardness equal to or larger than 7 and high transmittance of far-infrared rays in view of scratch resistance. In a case in which the antireflection film is provided on the surface on the vehicle exterior side (surface 20A), the layer closest to the vehicle exterior side of the antireflection film is particularly preferably a DLC film.

The shape of the far-infrared ray transmission member 20 is not particularly limited, but may be preferably a plate shape matching the shape of the opening 19. That is, in a case in which the opening 19 has a circular shape, for example, the far-infrared ray transmission member 20 may have a disc shape (cylinder shape).

As illustrated in FIG. 3, the glass 1 for vehicles according to the present embodiment is preferably configured such that an area of the opening 19 on the surface on the vehicle interior side is smaller than an area of the opening 19 on the surface on the vehicle exterior side, and accordingly, an area on the surface on the vehicle interior side of the far-infrared ray transmission member 20 is preferably smaller than an area on the surface on the vehicle exterior side thereof. Such a configuration improves strength against impact from the vehicle exterior side. More specifically, in a case in which the glass 1 for vehicles according to the present embodiment is laminated glass including the glass base body (vehicle exterior side) and the glass base body 14 (vehicle interior side), the opening 19 is formed by an opening 12a of the glass base body 12 and an opening 14a of the glass base body 14 overlapping each other. In this case, an area of the opening 12a of the glass base body 12 may be caused to be larger than an area of the opening 14a of the glass base body 14, and the far-infrared ray transmission member 20 matching the size of the opening 12a of the glass base body 12 may be arranged in the opening 12a of the glass base body 12.

In view of strength, the thickness of the far-infrared ray transmission member 20 is preferably equal to or larger than 1.5 mm, more preferably equal to or larger than 2.0 mm, and yet more preferably equal to or larger than 3.0 mm. An upper limit of the thickness of the far-infrared ray transmission member 20 is not particularly limited, but is normally equal to or smaller than 5.0 mm. Herein, the thickness means a length of the far-infrared ray transmission member 20 in the Z-direction.

To achieve both of widening of a viewing angle of the far-infrared camera CA1 and improvement of mechanical characteristics, for example, the far-infrared ray transmission member 20 may be caused to have a lens shape. Such a configuration is preferable because far-infrared light can be efficiently collected even if the area of the far-infrared ray transmission member 20 is small. In this case, the number of far-infrared ray transmission members 20 having a lens shape is preferably 1 to 3, and typically preferably 2. Furthermore, it is particularly preferable that the far-infrared ray transmission member 20 having a lens shape is aligned and modularized in advance, and integrated with a housing for bonding the far-infrared camera CA1 to the glass 1 for vehicles, or a bracket.

(Far-Infrared Ray Transmission Region)

Next, the following describes the far-infrared ray transmission region B. As illustrated in FIG. 2, the far-infrared ray transmission region B is formed in the vicinity of the upper edge part 1a of the glass 1 for vehicles in the Y-direction, and in the vicinity of the center of the glass 1 for vehicles in the X-direction. Hereinafter, the position of the far-infrared ray transmission region B can be also referred to as the opening 19 and the far-infrared ray transmission member 20 unless otherwise noted. The following is specific description.

The far-infrared ray transmission region B is disposed between the upper edge part 1a of the glass 1 for vehicles and a first position P1 in the Y-direction. The first position P1 is a position at which a distance from the upper edge part 1a in the Y-direction is 30% of a length from the upper edge part 1a to the lower edge part 1b. In other words, it is assumed that the length from the upper edge part 1a to the lower edge part 1b in the Y-direction is a length L1, and a length from the upper edge part 1a to the first position P1 in the Y-direction is a length L1a. In this case, the length L1a is 30% of the length L1. The length L1a is more preferably 28% of the length L1, and even more preferably 25% thereof. Positions of the upper edge part 1a and the lower edge part 1b in the X-direction as a reference of the length L1 are the same as positions of the upper edge part 1a and the first position P1 in the X-direction as a reference of the length L1a. That is, for example, the length L1 may be a length between the upper edge part 1a and the lower edge part 1b in the Y-direction at the center position in the X-direction, and the length L1a may be a length between the upper edge part 1a and the first position P1 in the Y-direction at the center position in the X-direction. As the far-infrared ray transmission region B is disposed between the first position P1 and the upper edge part 1a positioned as described above in the Y-direction, the visual field of the driver in the transparent region A1 can be appropriately secured.

The far-infrared ray transmission region B is disposed between a second position P2 and a third position P3 of the glass 1 for vehicles in the X-direction. The second position P2 is positioned to be closer to the side edge part 1c than the center point O of the glass 1 for vehicles in the X-direction, and the third position P3 is positioned to be closer to the side edge part 1d than the center point O of the glass 1 for vehicles in the X-direction. At the third position P3, a distance from the center point O in the X-direction is equal to that at the second position P2. In other words, a length L2a1 from the second position P2 to the center point O in the X-direction is equal to a length L2a2 from the third position P3 to the center point O in the X-direction. A length from the second position P2 to the third position P3 in the X-direction is 55% of a length from the side edge part 1c to the side edge part 1d. In other words, assuming that the length from the side edge part 1c to the side edge part 1d in the X-direction is the length L2 and the length from the second position P2 to the third position P3 in the X-direction is the length L2a, the length L2a is 55% of the length L2. The length L2a is more preferably 40% of the length L2, and even more preferably 30% thereof. Positions of the side edge part 1c and the side edge part 1d in the Y-direction as a reference of the length L2 are the same as positions of the second position P2 and the third position P3 in the Y-direction as a reference of the length L2a. That is, for example, the length L2 may be a length between the side edge part 1c and the side edge part 1d in the X-direction at the center position in the Y-direction, and the length L2a may be a length between the second position P2 and the third position P3 in the X-direction at the center position in the Y-direction. The far-infrared ray transmission region B is disposed between the second position P2 and the third position P3 in the X-direction, and as a result, positioned in the vicinity of the center in the X-direction. Accordingly, at the time of shaping the glass 1 for vehicles, it is possible to prevent distortion in the periphery of the opening 19 from being increased, and reduce the possibility that an image of the visible light camera CA2 arranged in the visible light transmission region C is influenced. That is, by disposing the far-infrared ray transmission region B at this position, the visible light camera CA2 is enabled to appropriately perform imaging even in a case in which the visible light transmission region C is arranged near the far-infrared ray transmission region B.

As described above, the far-infrared ray transmission region B, that is, the opening 19 and the far-infrared ray transmission member 20 are positioned between the upper edge part 1a and the first position P1 in the Y-direction, and positioned between the second position P2 and the third position P3 in the X-direction. In other words, it can be said that the far-infrared ray transmission region B is disposed in a region AR surrounded by the upper edge part 1a, the first position P1, the second position P2, and the third position P3.

In the glass 1 for vehicles, a perspective distortion amount in the periphery of the far-infrared ray transmission region B, that is, in the periphery of the opening 19 is preferably equal to or smaller than 0.2, even more preferably equal to or smaller than 0.18, and yet more preferably equal to or smaller than 0.15. The perspective distortion amount is measured by using a method conforming to JIS R 3212, for example. For example, perspective distortion is measured by projecting an image in which a plurality of circular bodies are depicted by a projector, and measuring a maximum deformation amount and a minimum deformation amount of the circular bodies projected on the screen at the time when the glass 1 for vehicles as a specimen is moved. Herein, the periphery of the far-infrared ray transmission region B (opening 19) means a position that is distant from an outer circumference of the far-infrared ray transmission region B (opening 19) toward an outer side in a radial direction by 0 mm to 200 mm when viewed from the Z-direction. Herein, the radial direction is a radial direction with respect to the center of the far-infrared ray transmission region B (opening 19) viewed from the Z-direction. By causing the perspective distortion amount in the periphery of the far-infrared ray transmission region B to fall within the range described above, imaging can be appropriately performed by the visible light camera CA2 even in a case in which the visible light transmission region C is arranged near the far-infrared ray transmission region B.

As illustrated in FIG. 3, regarding the far-infrared ray transmission member 20 in the far-infrared ray transmission region B, a length D1 of the longest straight line among straight lines each connecting optional two points in the surface on the vehicle exterior side is equal to or smaller than 80 mm. The length D1 is preferably equal to or smaller than 70 mm, and more preferably equal to or smaller than 65 mm. The length D1 is also preferably equal to or larger than 60 mm. As illustrated in FIG. 3, regarding the opening 19 in the far-infrared ray transmission region B, a length D2 of the longest straight line among straight lines each connecting optional two points in the surface on the vehicle exterior side is equal to or smaller than 80 mm. The length D2 is preferably equal to or smaller than 70 mm, and more preferably equal to or smaller than 65 mm. The length D2 is also preferably equal to or larger than 60 mm. It can also be said that the length D2 is the length of the longest straight line among straight lines each connecting optional two points on the outer circumference of the opening 19 on the surface on the vehicle exterior side (surface 12A) of the glass 1 for vehicles. By causing the length D1 of the far-infrared ray transmission member 20 and the length D2 of the opening 19 to fall within the range described above, the strength of the glass 1 for vehicles can be prevented from being lowered, and the perspective distortion amount in the periphery of the opening 19 can be suppressed. Each of the lengths D1 and D2 is a length corresponding to a diameter of the surface on the vehicle exterior side in a case in which the surface on the vehicle exterior side of the far-infrared ray transmission member 20 has a circular shape. Herein, each of the lengths D1 and D2 indicates a length in a state in which the glass 1 for vehicles is mounted on the vehicle V. For example, in a case of performing bending processing on the glass to have a shape to be mounted on the vehicle V, each of the lengths D1 and D2 is a length in a state after the bending processing is performed. The same applies to the description about dimensions or positions other than the lengths D1 and D2 unless otherwise noted.

A radiation amount of far-infrared rays that reach the far-infrared camera CA1 mounted on the glass 1 for vehicles according to the present embodiment depends on a size of the largest circle among circles formed within a projection drawing obtained by projecting the far-infrared ray transmission member 20 in the optical axis direction of the far-infrared camera CA1. The following describes details with reference to the drawings.

Figure 5:
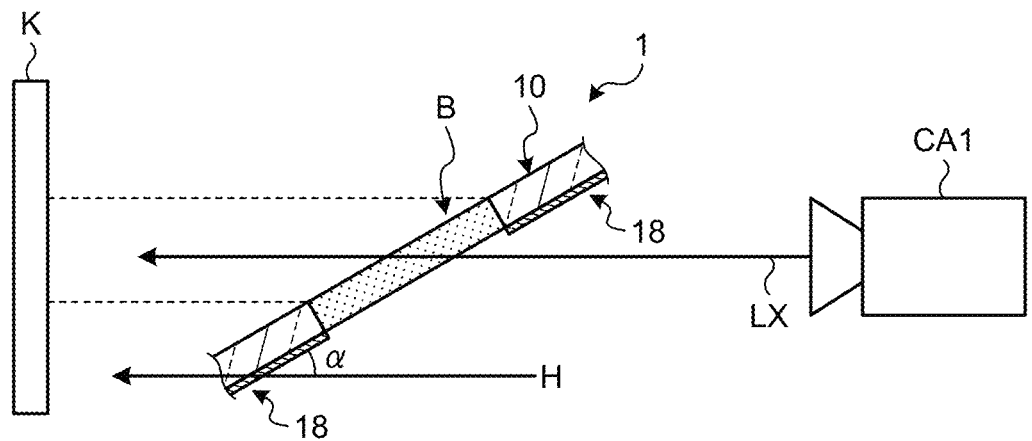
FIG. 5 is an enlarged cross-sectional view of the periphery of a far-infrared ray transmission region of the glass for vehicles.
Figure 6:
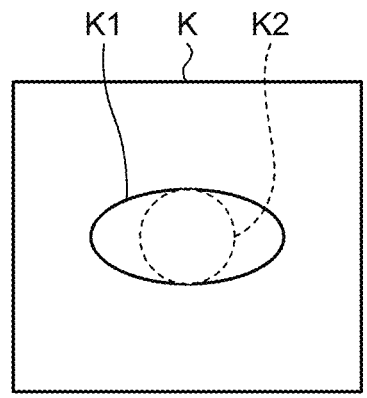
FIG. 6 is a schematic diagram for explaining a projection drawing and a circle projected on a projection surface in FIG. 5.

FIG. 5 is an enlarged cross-sectional view of the periphery of the far-infrared ray transmission region of the glass for vehicles. FIG. 6 is a schematic diagram for explaining the projection drawing and the circle projected on a projection surface in FIG. 5. As illustrated in FIG. 5, the glass 1 for vehicles is mounted on the vehicle V normally in a state of being inclined at a predetermined angle $\alpha$ with respect to a horizontal direction H. On the other hand, the far-infrared camera CA1 is normally mounted so that an optical axis LX is substantially horizontal. Thus, the radiation amount of far-infrared rays that reach the far-infrared camera CA1 depends not only on the size of the far-infrared ray transmission member 20 but also on this angle $\alpha$. Considering the fact described above, in examining the radiation amount of far-infrared rays that reach the far-infrared camera CA1, it is reasonable to examine a size of a projection drawing K1. The projection drawing is obtained by projecting the far-infrared ray transmission member 20 on a projection surface K which is perpendicular to the optical axis LX, in a direction of the optical axis LX of the far-infrared camera CA1. In addition, a visual field of the far-infrared camera CA1 normally has a circular shape, so that it is reasonable to examine a size of the largest circle K2 among circles formed inside the projection drawing K1 as illustrated in FIG. 6.

The present inventors have repeatedly performed experiments, and have found that, when a diameter of the largest circle K2 among circles formed inside the projection drawing K1 is equal to or larger than 12 mm, the radiation amount of far-infrared rays that reach the far-infrared camera CA1 can be prevented from being reduced, luminance deterioration and a blur in an obtained thermal image can be suppressed, and definition of the thermal image can be sufficiently secured.

Thus, in the glass 1 for vehicles according to the present embodiment, among the circles formed inside the projection drawing K1 obtained by projecting the far-infrared ray transmission member 20 in the optical axis LX direction of the far-infrared camera CA1, the diameter of the largest circle K2 is set to be equal to or larger than 12 mm, preferably equal to or larger than 20 mm, and more preferably equal to or larger than 30 mm.

The projection drawing K1 obtained by projecting the far-infrared ray transmission member 20 in the optical axis LX direction of the far-infrared camera CA1 means a drawing obtained by projecting the shape of the surface on the vehicle exterior side of the far-infrared ray transmission member 20 on a plane perpendicular to the optical axis LX in the optical axis LX direction.

Figure 7:
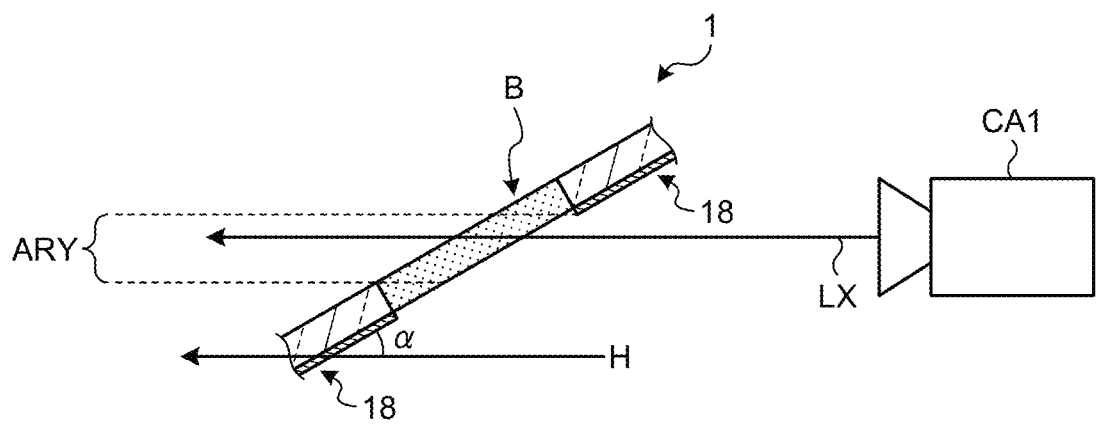
FIG. 7 is an enlarged cross-sectional view of the periphery of the far-infrared ray transmission region of the glass for vehicles.
Figure 8:
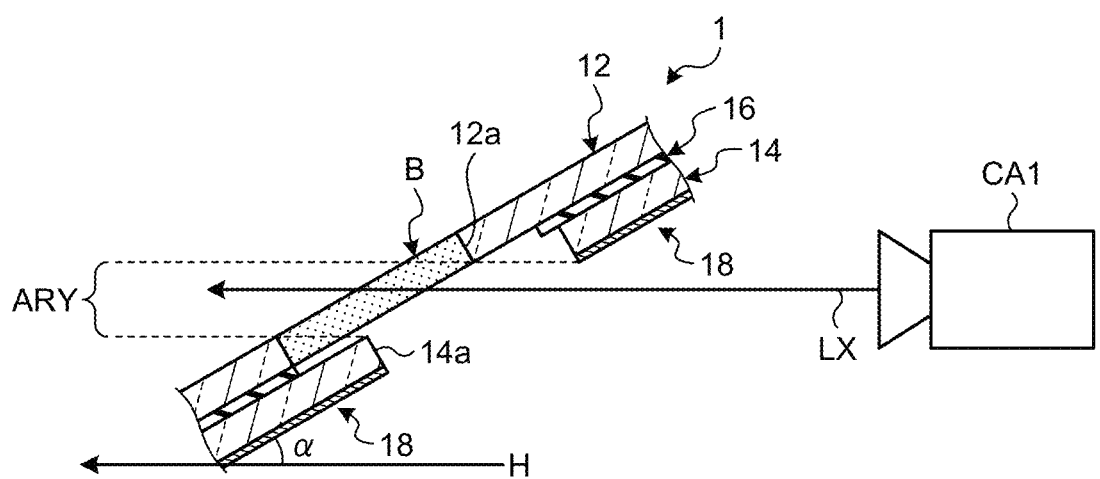
FIG. 8 is an enlarged cross-sectional view of the periphery of the far-infrared ray transmission region of the glass for vehicles.

FIG. 7 and FIG. 8 are enlarged cross-sectional views of the periphery of the far-infrared ray transmission region of the glass for vehicles. Depending on the size of the far-infrared ray transmission member 20 or the thickness of the glass base body 10, if an angle $\alpha$ of inclination with respect to the horizontal direction is too small at the time of mounting the glass 1 for vehicles according to the present embodiment on the vehicle V, a problem as described below is caused. That is, in a case in which the angle $\alpha$ is too small and the glass 1 for vehicles is observed in a direction parallel to the optical axis LX, a region including only the far-infrared ray transmission member 20, that is, a region not including the glass base body 10 or the light blocking layer 18 (a region ARY in FIG. 7) becomes small. If the region ARY is too small, there is the possibility that definition of a thermal image obtained by the far-infrared camera CA1 cannot be sufficiently secured. Thus, as the angle $\alpha$, it is preferable to appropriately select an angle with which the region ARY does not become too small. The angle $\alpha$ is preferably 20 degrees to 90 degrees. The angle $\alpha$ is more preferably equal to or larger than 30 degrees, and even more preferably equal to or larger than 35 degrees.

In a case in which the glass base body 10 is laminated glass including the glass base body 12 (vehicle exterior side) and the glass base body 14 (vehicle interior side), as illustrated in FIG. 8, the center of the opening 12a of the glass base body 12 may be appropriately shifted from the center of the opening 14a of the glass base body 14. With such a configuration, even in a case in which the angle $\alpha$ is particularly small, the opening 12a and the opening 14a are not required to be excessively large to secure the size of the region ARY, so that particularly high strength and high definition can be achieved.

(Visible Light Transmission Region)

Next, the following describes the visible light transmission region C. Regarding the visible light transmission region C, average transmittance of visible light is preferably 70% to 100%. As illustrated in FIG. 2, the visible light transmission region C is preferably disposed in the vicinity of the far-infrared ray transmission region B. Specifically, the center of the far-infrared ray transmission region B viewed from the Z-direction is assumed to be a center point OB, and the center of the visible light transmission region C viewed from the Z-direction is assumed to be a center point OC. In this case, a distance L3 between the center point OB and the center point OC is preferably 30 mm to 200 mm, and is more preferably 50 mm to 150 mm. The distance L3 indicates the shortest distance between the center point OB and the center point OC. In the following description, the distance L3 similarly indicates the shortest distance between the two points unless otherwise specified. Assuming that the shortest distance between the far-infrared ray transmission region B (opening 19) and the visible light transmission region C when viewed from the Z-direction is assumed to be a distance L4, the distance L4 is preferably larger than 0 mm and equal to or smaller than 100 mm, and is more preferably 10 mm to 80 mm. By positioning the visible light transmission region C in the range described above with respect to the far-infrared ray transmission region B, the perspective distortion amount in the visible light transmission region C can be suppressed and an image can be appropriately taken by the visible light camera CA2 while enabling the far-infrared camera CA1 and the visible light camera CA2 to take images at close positions. By taking images at close positions by the far-infrared camera CA1 and the visible light camera CA2, a load for performing arithmetic processing on data obtained from each of the cameras is reduced, and a power supply and a signal cable can be preferably handled.

Figure 9:
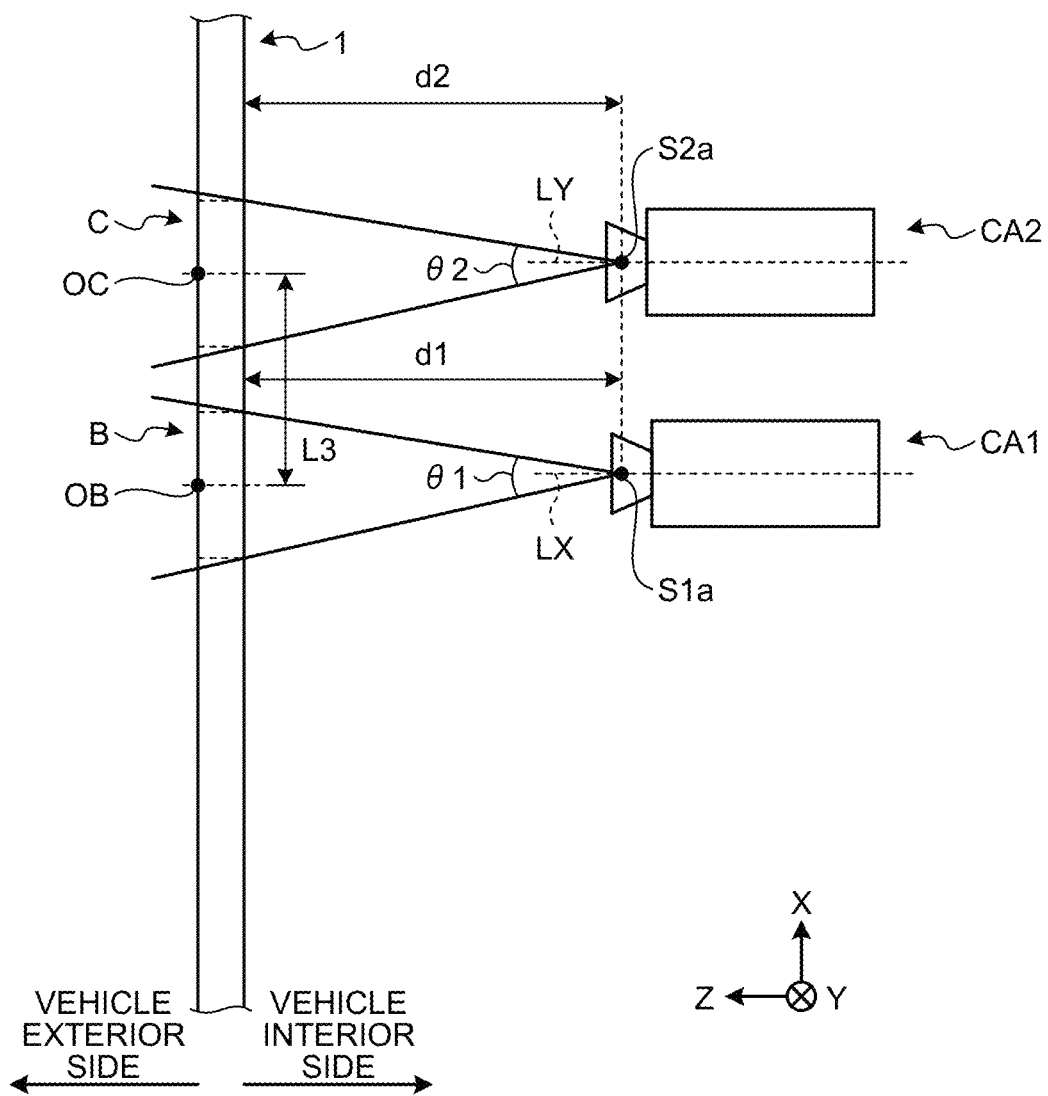
FIG. 9 is a schematic diagram for explaining a positional relation between the far-infrared ray transmission region and a visible light transmission region.

FIG. 9 is a schematic diagram for explaining a positional relation between the far-infrared ray transmission region and the visible light transmission region. FIG. 9 is a schematic diagram in a case of viewing the glass 1 for vehicles from the vertical direction when optical axes LX and LY of the far-infrared camera CA1 and the visible light camera CA2 run along the horizontal direction. As illustrated in FIG. 9, the far-infrared camera CA1 is preferably disposed so that the center point OB of the far-infrared ray transmission region B is positioned on an extension line of the optical axis LX of the far-infrared camera CA1, and the visible light camera CA2 is preferably disposed so that the center point OC of the visible light transmission region C is positioned on an extension line of the optical axis LY of the visible light camera CA2. Herein, as illustrated in FIG. 9, a distance between a focal position S1a of the far-infrared camera CA1 and a surface on the vehicle interior side of the glass 1 for vehicles in a direction along the optical axis LX of the far-infrared camera CA1 is assumed to be a distance d1, and an angle of view of the far-infrared camera CA1 is assumed to be an angle θ1. Additionally, a distance between a focal position S2a of the visible light camera CA2 and the surface on the vehicle interior side of the glass 1 for vehicles in a direction along the optical axis LY of the visible light camera CA2 is assumed to be a distance d2, and an angle of view of the visible light camera CA2 is assumed to be an angle θ2.

In this case, the distance L3 between the center point OB and the center point OC preferably satisfies the following expression (1).

$$L3 \geq \{d1 \cdot \tan(\theta1/2) + d2 \cdot \tan(\theta2/2)\} \quad (1)$$

When the distance L3 satisfies the expression (1), the visual field of the far-infrared camera CA1 is prevented from being included in the visible light transmission region C, or the visual field of the visible light camera CA2 is prevented from being included in the far-infrared ray transmission region B. Accordingly, an image can be appropriately taken.

Returning to FIG. 2, the visible light transmission region C and the far-infrared ray transmission region B are preferably positioned side by side in the X-direction. That is, it is preferable that the visible light transmission region C is not positioned on the Y-direction side with respect to the far-infrared ray transmission region B, but is positioned side by side with the far-infrared ray transmission region B in the X-direction. For example, a distance L3Y between the center point OC of the visible light transmission region C and the center point OB of the far-infrared ray transmission region B in the Y-direction is preferably 0 mm to 25 mm. It can also be said that the distance L3Y indicates a distance in the Y-direction between a plane orthogonal to the Y-direction and passing through the center point OB and a plane orthogonal to the Y-direction and passing through the center point OC. By arranging the visible light transmission region C side by side with the far-infrared ray transmission region B in the X-direction, the visible light transmission region C can be arranged in the vicinity of the upper edge part 1a. Accordingly, the visual field of the driver in the transparent region A1 can be appropriately secured.

Similarly to the far-infrared ray transmission region B, it is preferable that the visible light transmission region C is positioned between the upper edge part 1a and the first position P1 in the Y-direction, and positioned between the second position P2 and the third position P3 in the X-direction. By arranging the visible light transmission region C at this position, the perspective distortion amount in the visible light transmission region C can be suppressed and an image can be appropriately taken by the visible light camera CA2 while enabling the far-infrared camera CA1 and the visible light camera CA2 to take images at close positions.

(Configuration of Camera Unit)

Figure 10:
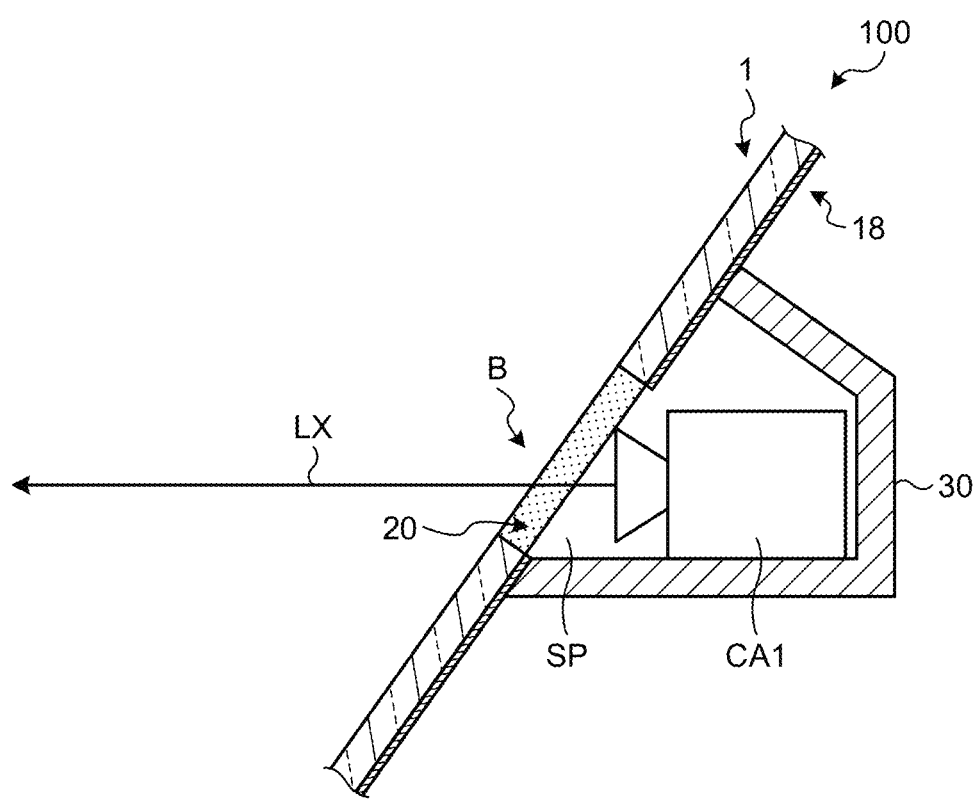
FIG. 10 is a diagram illustrating a configuration example in a case of mounting a far-infrared camera on the glass for vehicles.

Next, the following describes a configuration of the camera unit 100 according to the present embodiment, more specifically, a configuration example in a case of mounting the far-infrared camera CA1 on the glass 1 for vehicles. FIG. 10 is a diagram illustrating the configuration example in a case of mounting the far-infrared camera on the glass for vehicles.

The camera unit 100 according to the present embodiment includes the glass 1 for vehicles, the far-infrared camera CA1, and the visible light camera CA2. The glass 1 for vehicles has been described above. The far-infrared camera CA1 is mounted on the glass 1 for vehicles so as to be able to take a thermal image of the outside through the far-infrared ray transmission region B of the glass 1 for vehicles. The far-infrared camera CA1 is disposed at a position opposed to the far-infrared ray transmission region B inside the vehicle V (within the vehicle).

A type of the far-infrared camera CA1 is not particularly limited, and a known far-infrared camera can be used. As illustrated in FIG. 10, the far-infrared camera CA1 is mounted on the glass 1 for vehicles with a bracket 30, for example. The far-infrared camera CA1 is normally mounted so that the optical axis LX becomes substantially horizontal.

To make an image (thermal image) obtained by the far-infrared camera CA1 clear, a temperature of the far-infrared camera CA1 is preferably kept constant.

As a unit for keeping the temperature of the far-infrared camera CA1 constant, an insulating property within the bracket 30 may be enhanced. To enhance the insulating property within the bracket 30, an inner part of the bracket 30 may be kept vacuum, or an insulating material may be filled in the inner part of the bracket 30. That is, in the camera unit 100 according to the present embodiment, it is preferable that the far-infrared camera CA1 is mounted on the glass 1 for vehicles via the bracket 30, and the inner part of the bracket 30 is kept vacuum or an insulating material is filled therein.

Additionally, as a unit for keeping the temperature of the far-infrared camera CA1 constant, the temperature within the bracket 30 may be adjusted by a temperature regulator. That is, in the glass 1 for vehicles according to the present embodiment, it is preferable that the far-infrared camera CA1 is mounted on the glass 1 for vehicles via the bracket 30, and further includes the temperature regulator for adjusting the temperature within the bracket 30.

The visible light camera CA2 is mounted on the glass 1 for vehicles so as to be able to take an image of the outside through the visible light transmission region C of the glass 1 for vehicles. The visible light camera CA2 is disposed at a position opposed to the visible light transmission region C inside the vehicle V (within the vehicle). The visible light camera CA2 is preferably mounted so that the optical axis LX of the far-infrared camera CA1 is substantially parallel with the optical axis LY of the visible light camera CA2. "Substantially parallel" is a concept including not only a case in which these optical axes are completely parallel with each other but also a case in which these optical axes slightly deviate from parallel positions as an allowable error. With such a configuration, the optical axis LX of the far-infrared camera CA1 substantially agrees with the center of the visual field of the visible light camera CA2, which is preferable at the time of performing information processing by combining images obtained from these cameras.

Other Examples

Next, the following describes other examples of the glass 1 for vehicles and the camera unit 100 according to the present embodiment. In the other examples, at least one of the far-infrared camera CA1 and the visible light camera CA2 is a stereo camera. In the other examples, description about the same configuration as that in the embodiment described above will not be repeated.

Figure 11:
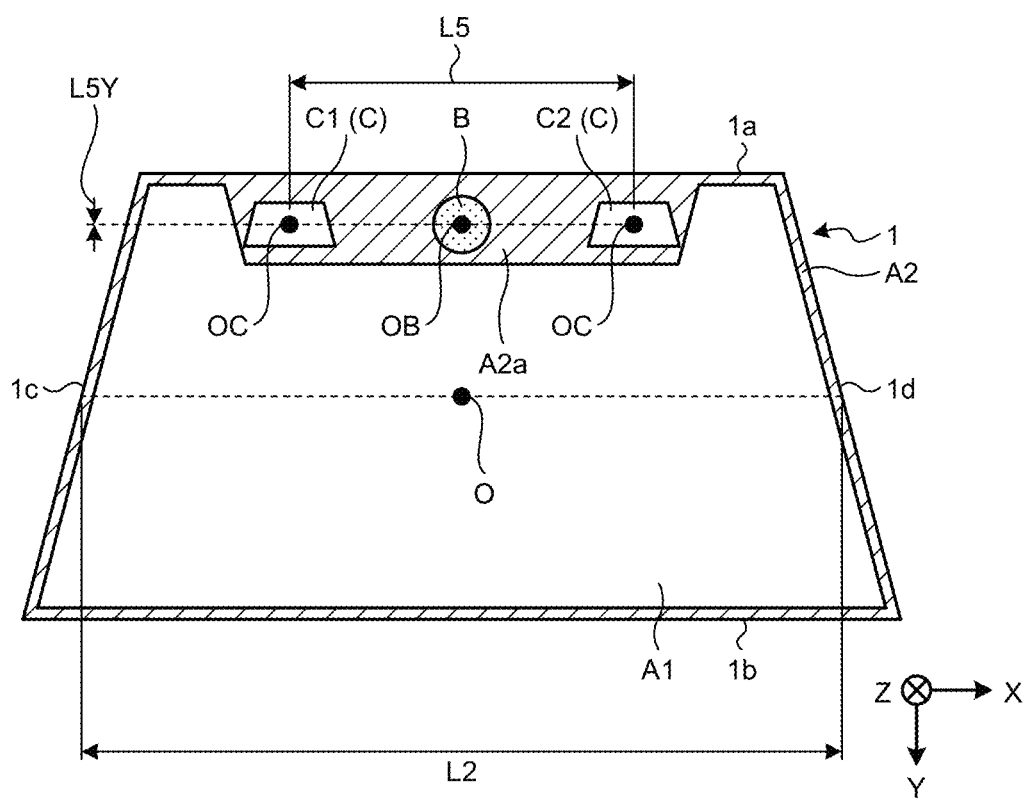
FIG. 11 is a schematic plan view of glass for vehicles according to another example of the present embodiment.
Figure 12:
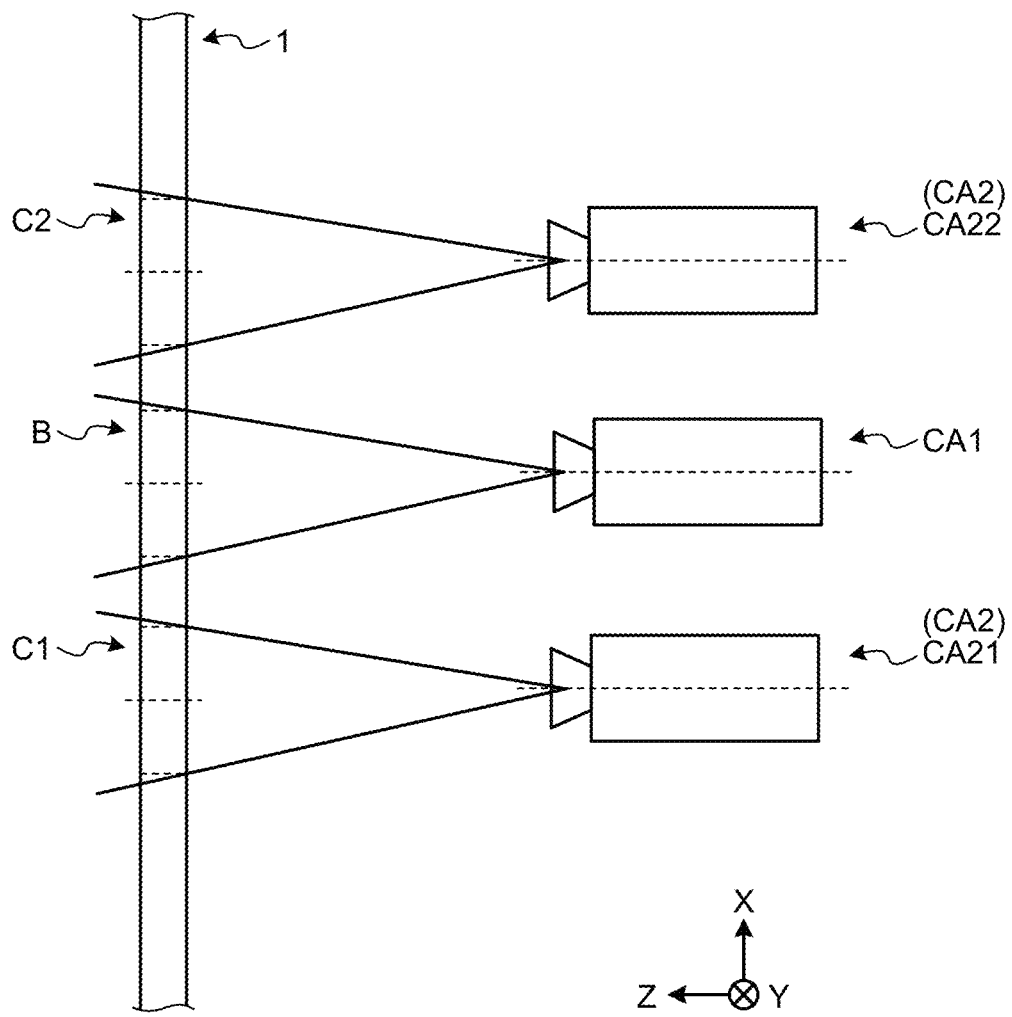
FIG. 12 is a schematic diagram of a camera unit according to another example of the present embodiment.

FIG. 11 is a schematic plan view of the glass for vehicles according to another example of the present embodiment, and FIG. 12 is a schematic diagram of the camera unit according to the other example of the present embodiment. In this example, as illustrated in FIG. 12, the camera unit 100 includes a first visible light camera CA21 and a second visible light camera CA22 as the visible light camera CA2. In this case, as illustrated in FIG. 11, a first visible light transmission region C1 and a second visible light transmission region C2 are formed as the visible light transmission region C on the glass 1 for vehicles. In this case, the far-infrared ray transmission region B is preferably positioned between the first visible light transmission region C1 and the second visible light transmission region C2 in the X-direction. Also in this case, the first visible light transmission region C1, the far-infrared ray transmission region B, and the second visible light transmission region C2 are preferably arranged side by side in the X-direction. That is, for example, a distance L5Y in the Y-direction between the center point OB of the far-infrared ray transmission region B and center points OC of the first visible light transmission region C1 and the second visible light transmission region C2 is preferably 0 mm to 25 mm. It can also be said that the distance L5Y indicates a maximum distance among distances in the Y-direction between any two of a plane orthogonal to the Y-direction and passing through the center point OB of the far-infrared ray transmission region B, a plane orthogonal to the Y-direction and passing through the center point OC of the first visible light transmission region C1, and a plane orthogonal to the Y-direction and passing through the center point OC of the second visible light transmission region C2. A distance L5 between the center point OC of the first visible light transmission region C1 and the center point OC of the second visible light transmission region C2 is preferably 5% to 80% of the distance L2 between the side edge part 1c and the side edge part 1d. Additionally, a distance between the center point OC of the first visible light transmission region C1 and the center point OB of the far-infrared ray transmission region B is preferably equal to a distance between the center point OC of the second visible light transmission region C2 and the center point OB of the far-infrared ray transmission region B.

As illustrated in FIG. 12, in this example, the first visible light camera CA21 is disposed at a position opposed to the first visible light transmission region C1 inside the vehicle V (within the vehicle). The second visible light camera CA22 is then disposed at a position opposed to the second visible light transmission region C2 inside the vehicle V (within the vehicle). Thus, the far-infrared camera CA1 is positioned between the first visible light camera CA21 and the second visible light camera CA22.

Figure 13:
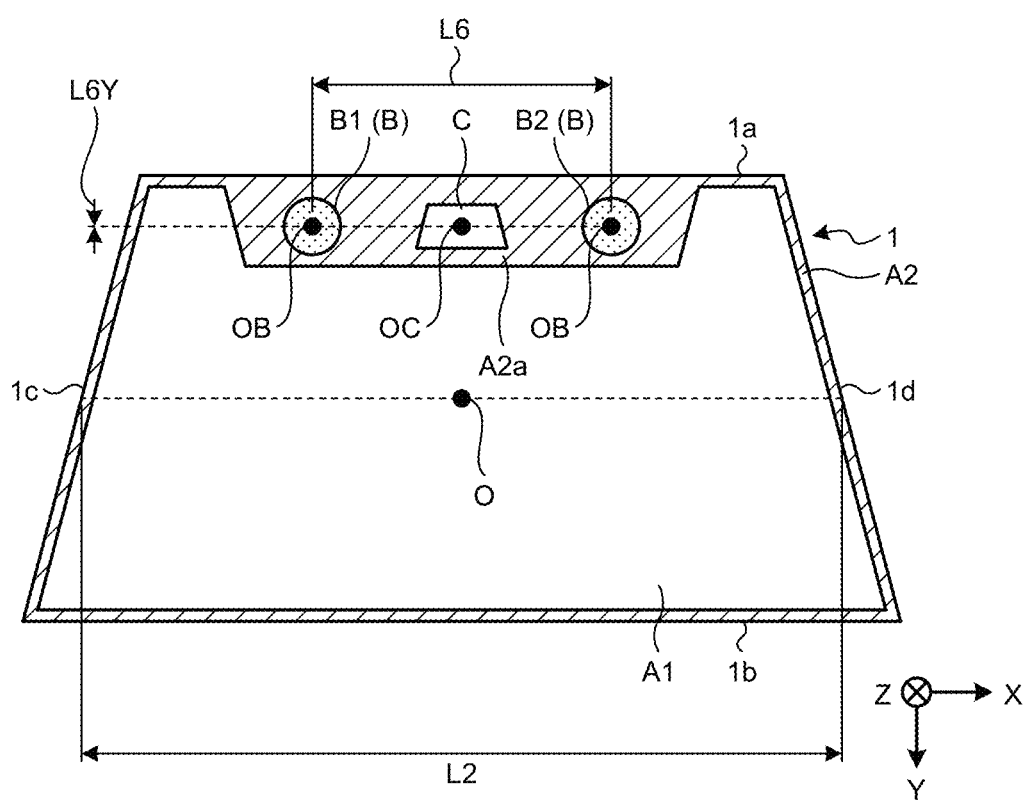
FIG. 13 is a schematic plan view of glass for vehicles according to another example of the present embodiment.
Figure 14:
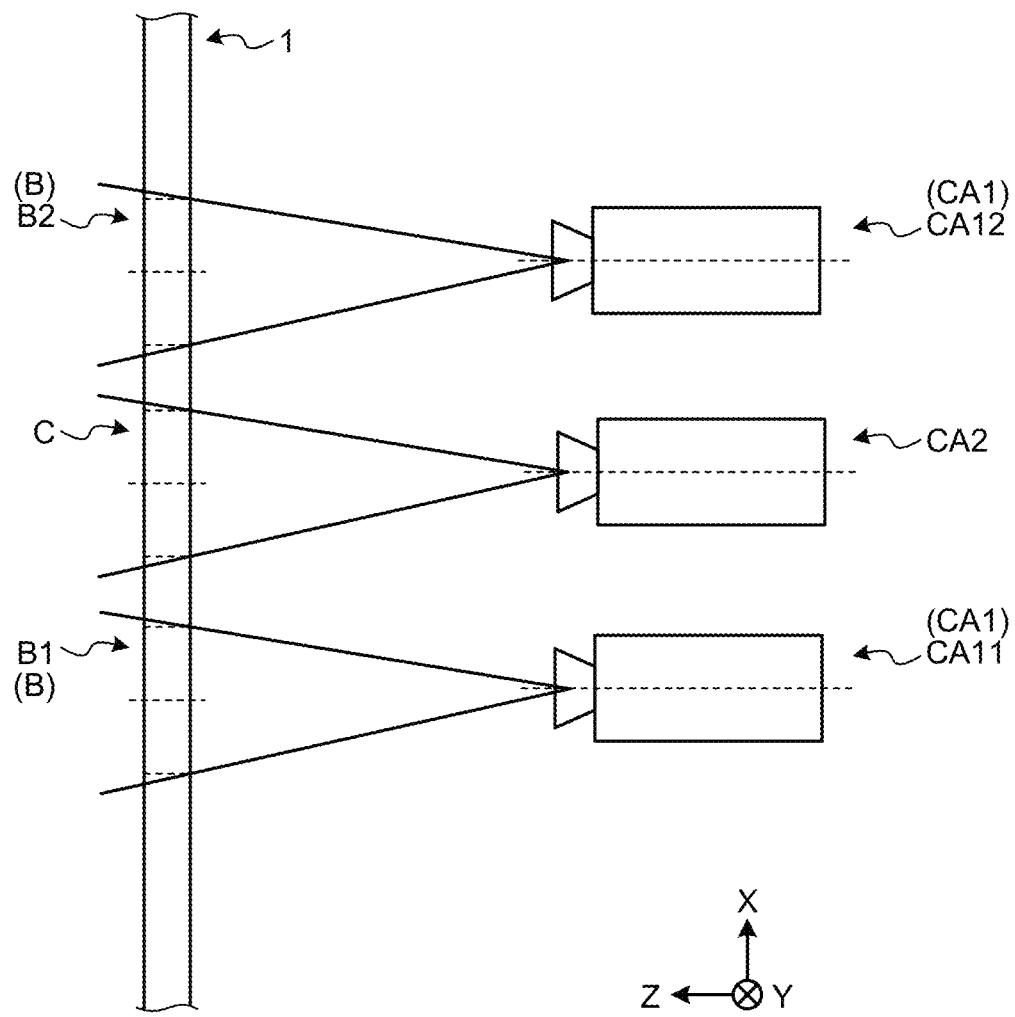
FIG. 14 is a schematic diagram of a camera unit according to another example of the present embodiment.

FIG. 13 is a schematic plan view of the glass for vehicles according to another example of the present embodiment, and FIG. 14 is a schematic diagram of the camera unit according to the other example of the present embodiment. In this example, as illustrated in FIG. 14, the camera unit 100 includes a first far-infrared camera CA11 and the second visible light camera CA22 as far-infrared cameras CA1. In this case, as illustrated in FIG. 13, a first far-infrared ray transmission region B1 and a second far-infrared ray transmission region B2 are formed as far-infrared ray transmission regions B on the glass 1 for vehicles. In this case, the visible light transmission region C is preferably positioned between the first far-infrared ray transmission region B1 and the second far-infrared ray transmission region B2 in the X-direction. Also in this case, the first far-infrared ray transmission region B1, the visible light transmission region C, and the second far-infrared ray transmission region B2 are preferably arranged side by side in the X-direction. That is, for example, a distance L6Y in the Y-direction between the center point OC of the visible light transmission region C and center points OB of the first far-infrared ray transmission region B1 and the second far-infrared ray transmission region B2 is preferably 0 mm to 25 mm. It can also be said that the distance L6Y indicates a maximum distance among distances in the Y-direction between any two of a plane orthogonal to the Y-direction and passing through the center point OB of the first far-infrared ray transmission region B1, a plane orthogonal to the Y-direction and passing through the center point OB of the second far-infrared ray transmission region B2, and a plane orthogonal to the Y-direction and passing through the center point OC of the visible light transmission region C. A distance L6 between the center point OB of the first far-infrared ray transmission region B1 and the center point OB of the second far-infrared ray transmission region B2 is preferably 5% to 50% of the distance L2 between the side edge part 1c and the side edge part 1d. Additionally, a distance between the center point OB of the first far-infrared ray transmission region B1 and the center point OC of the visible light transmission region C is preferably equal to a distance between the center point OB of the second far-infrared ray transmission region B2 and the center point OC of the visible light transmission region C.

As illustrated in FIG. 14, in this example, the first far-infrared camera CA11 is disposed at a position opposed to the first far-infrared ray transmission region B1 inside the vehicle V (within the vehicle). A second far-infrared camera CA12 is then disposed at a position opposed to the second far-infrared ray transmission region B2 inside the vehicle V (within the vehicle). Thus, the visible light camera CA2 is positioned between the first far-infrared camera CA11 and the second far-infrared camera CA12.

(Manufacturing Method for Glass for Vehicles)

Next, the following describes an example of a manufacturing method for the glass 1 for vehicles. FIG. 15 is a schematic diagram for explaining an example of the manufacturing method for the glass for vehicles according to the present embodiment. As exemplified in FIG. 15, in a case of manufacturing the glass 1 for vehicles, the glass base bodies 12 and 14 having a flat-plate shape are prepared, and the openings 12a and 14a are formed thereon (Step S10). Each of the glass base bodies 12 and 14 having a flat-plate shape on which the openings 12a and 14a are formed is subjected to bending processing (Step S12) to have a shape matching the windshield of the vehicle V. The glass base body 12 and the glass base body 14 subjected to the bending processing are bonded to each other via the intermediate layer 16 to be laminated glass (Step S14). In this case, the glass base body 12 is bonded to the glass base body 14 so that the opening 12a communicates with the opening 14a and the intermediate layer 16 is not formed at a communicating point thereof. After being the laminated glass, only a portion of the intermediate layer 16 overlapping the opening 12a and the opening 14a may be removed by using a thermal/chemical method to make communication. Due to this, the opening 12a communicates with the opening 14a, and the opening 19 is formed. The far-infrared ray transmission member 20 is then filled in the opening 19 (Step S16), and the glass 1 for vehicles is completely manufactured. Additionally, the light blocking layer 18 may be formed. The light blocking layer 18 may be formed at any step from Step S10 to Step S16, for example, may be formed before the bending processing.

As described above, the glass 1 for vehicles according to the present embodiment includes the light blocking region A2, and the far-infrared ray transmission region B and the visible light transmission region C that transmits visible light are formed in the light blocking region A2. In the far-infrared ray transmission region B, the opening 19 and the far-infrared ray transmission member 20 arranged in the opening 19 are disposed. The opening 19 is formed between the upper edge part 1a and the first position P1 in the Y-direction (first direction) from the upper edge part 1a of the glass 1 for vehicles toward the lower edge part 1b. The first position P1 is a position at which a distance from the upper edge part 1a becomes 30% of a length from the upper edge part 1a to the lower edge part 1b. The opening 19 is formed between the second position P2 and the third position P3 in the X-direction (second direction) from the side edge part 1c of the glass 1 for vehicles toward the side edge part 1d. The second position P2 is positioned to be closer to the side edge part 1c than the center point O of the glass 1 for vehicles, and the third position P3 is positioned to be closer to the side edge part 1d than the center point O of the glass 1 for vehicles. At the third position P3, a distance from the center point O in the X-direction is equal to that at the second position P2. A length from the second position P2 to the third position P3 is 55° of the length from the side edge part 1c to the side edge part 1d. Regarding the opening 19, the length D2 of the longest straight line among straight lines each connecting optional two points in the surface on the vehicle exterior side is equal to or smaller than 80 mm.

On the glass 1 for vehicles, the far-infrared ray transmission region B for the far-infrared camera CA1 and the visible light transmission region C for the visible light camera CA2 are formed. The position of the opening 19 in the far-infrared ray transmission region B is assumed to be between the upper edge part 1a and the first position P1 in the Y-direction, and between the second position P2 and the third position P3 in the X-direction. Additionally, the length D2 is assumed to be equal to or smaller than 80 mm. By forming the opening 19 as described above, the perspective distortion amount in the periphery of the opening 19 can be kept small. Thus, with the glass 1 for vehicles, by arranging the visible light transmission region C in the vicinity of the far-infrared ray transmission region B, the perspective distortion amount in the visible light transmission region C can be suppressed and an image can be appropriately taken by the visible light camera CA2 while enabling the far-infrared camera CA1 and the visible light camera CA2 to take images at close positions. Furthermore, by disposing the far-infrared ray transmission member 20 in the opening 19 to form the far-infrared ray transmission region B, the far-infrared camera CA1 can be arranged inside the vehicle, and a thermal image can be appropriately taken by the far-infrared camera CA1.

The perspective distortion amount in the periphery of the opening 19 is preferably equal to or smaller than 0.2. By causing the perspective distortion amount in the periphery of the opening 19 to fall within the range described above, the visible light transmission region C can be arranged in the vicinity of the far-infrared ray transmission region B, and an image can be appropriately taken by the visible light camera CA2.

The distance L3 between the center point OC of the visible light transmission region C and the center point OB of the far-infrared ray transmission region B is preferably equal to or smaller than 200 mm. By causing the distance L3 to fall within the range described above, the visible light transmission region C can be arranged in the vicinity of the far-infrared ray transmission region B, and an image can be appropriately taken by the visible light camera CA2.

The visible light transmission region C and the far-infrared ray transmission region B are preferably arranged side by side in the X-direction. Due to this, the visible light transmission region C can be arranged in the vicinity of the upper edge part 1a, and the visual field of the driver in the transparent region A1 can be appropriately secured.

Additionally, regarding the far-infrared ray transmission member 20, the average transmittance of far-infrared rays having a wavelength from 8 to 13 μm is preferably equal to or larger than 25%. Thus, with the glass 1 for vehicles, a thermal image can be appropriately taken by the far-infrared camera CA1.

The far-infrared ray transmission member 20 preferably includes at least one material selected from the group consisting of ZnS, Ge, Si, and chalcogenide glass. By using this material for the far-infrared ray transmission member 20, a thermal image can be appropriately taken by the far-infrared camera CA1.

The surface on the vehicle exterior side of the far-infrared ray transmission member 20 includes 3 to 12 layers of antireflection films, and a layer closest to the vehicle exterior side among the antireflection films is preferably a diamond-like carbon film. By providing such antireflection films to the far-infrared ray transmission member 20, a thermal image can be appropriately taken by the far-infrared camera CA1.

The surface on the vehicle exterior side of the far-infrared ray transmission member 20 is preferably formed to be continuous to the surface on the vehicle exterior side of the light blocking region A2. By configuring the far-infrared ray transmission member 20 as described above, a wiping effect of the wipers can be prevented from being deteriorated, the design of the vehicle V can be prevented from being deteriorated due to a level difference, and dust and the like can be prevented from accumulating on the level difference.

The far-infrared ray transmission member 20 is preferably attached with at least one of a urethane-based bonding agent and an acrylic-based bonding agent. Thus, the far-infrared ray transmission member 20 can be appropriately attached.

The area of the opening 19 on the surface on the vehicle interior side is preferably smaller than the area of the opening 19 on the surface on the vehicle exterior side. With the glass 1 for vehicles, the strength against impact from the vehicle exterior side can be prevented from being lowered.

The glass 1 for vehicles is mounted on the vehicle V including the far-infrared camera CA1 and the visible light camera CA2. It is preferable that the diameter of the largest circle K2, among the circles formed inside the projection drawing K1 obtained by projecting the far-infrared ray transmission member 20 in the optical axis LX direction of the far-infrared camera CA, is equal to or larger than 12 mm, and an average thickness of the far-infrared ray transmission member 20 is equal to or larger than 1.5 mm. By configuring the far-infrared ray transmission member 20 as described above, the strength of the far-infrared ray transmission member 20 can be appropriately secured.

The camera unit 100 according to the present embodiment includes the glass 1 for vehicles, the far-infrared camera CA1, and the visible light camera CA2. The far-infrared camera CA1 is mounted on the glass 1 for vehicles so as to be able to take a thermal image of the outside through the far-infrared ray transmission region B. The visible light camera CA2 is mounted on the glass 1 for vehicles so as to be able to take an image of the outside through the visible light transmission region C. By providing the glass 1 for vehicles having the configuration described above to the camera unit 100, the perspective distortion amount in the visible light transmission region C can be suppressed and an image can be appropriately taken by the visible light camera CA2 while enabling the far-infrared camera CA1 and the visible light camera CA2 to take images at close positions.

In the camera unit 100, it is preferable that the optical axis LX of the far-infrared camera CA1 is substantially parallel with the optical axis LY of the visible light camera CA2, and the distance between the optical axis LX of the far-infrared camera CA and the optical axis LY of the visible light camera CA2 is equal to or smaller than 200 mm. By arranging the far-infrared camera CA1 and the visible light camera CA2 as described above, an image can be appropriately taken.

It is also preferable that the camera unit 100 includes the first visible light camera CA21 and the second visible light camera CA22 as the visible light cameras CA2, and the far-infrared camera CA1 is positioned between the first visible light camera CA21 and the second visible light camera CA22. By arranging the cameras as described above, an image can be appropriately taken.

The camera unit 100 includes the first far-infrared camera CA11 and the second far-infrared camera CA12 as the far-infrared cameras CA1, and the visible light camera CA2 is positioned between the first far-infrared camera CA11 and the second far-infrared camera CA12. By arranging the cameras as described above, an image can be appropriately taken.

Additionally, it is preferable that the far-infrared camera CA1 is mounted on the glass 1 for vehicles via the bracket 30, and the inner part of the bracket 30 is kept vacuum or an insulating material is filled therein. By arranging the far-infrared camera CA1 as described above, a thermal image can be appropriately taken.

It is also preferable that the far-infrared camera CA1 is mounted on the glass 1 for vehicles via the bracket 30, and further includes the temperature regulator for adjusting the temperature within the bracket 30. By arranging the far-infrared camera CA1 as described above, a thermal image can be appropriately taken.

EXAMPLES

The following specifically describes the present invention with examples, but the present invention is not limited thereto.

First, the following describes examples of analyzing the perspective distortion amount. FIG. 16 is a diagram illustrating an analysis result of the perspective distortion amount in the periphery of the opening in a case of changing a position and a size of the opening. In this analysis, cross-sectional shapes traversing the center of the opening are extracted by 200 mm in front and rear of the center of the opening to calculate a quartic polynomial approximate curve, and a difference from a common model of the glass for vehicles is acquired to calculate a relative perspective distortion amount.

In an example 1, an outer diameter of the opening was assumed to be 50 mm, and coordinates of a center point of the opening were assumed to be (12.8, 21.7).

In an example 2, the outer diameter of the opening was assumed to be 50 mm, and the coordinates of the center point of the opening were assumed to be (31.3, 21.7).

In an example 3, the outer diameter of the opening was assumed to be 50 mm, and the coordinates of the center point of the opening were assumed to be (62.5, 21.7).

In an example 4, the outer diameter of the opening was assumed to be 75 mm, and the coordinates of the center point of the opening were assumed to be (15.0, 21.7).

In an example 5, the outer diameter of the opening was assumed to be 100 mm, and the coordinates of the center point of the opening were assumed to be (17.2, 21.7).

An example 6 was a reference example, and the opening was not disposed.

The outer diameter of the opening is an outer diameter in a case in which the glass for vehicles has a flat-plate shape without being subjected to bending processing. It can be said that the outer diameter of the opening is a value corresponding to the length D2 according to the present embodiment. The coordinates of the center point of the opening indicates, assuming that an intersection point of the Y-axis passing through the center point O of the glass for vehicles and the upper edge part of the glass for vehicles is an origin (0, 0), a distance from the origin in the X-direction and the Y-direction. That is, the center point of the opening in the example 1 is away from the origin in the X-direction by 12.8% of half of a total length of the glass for vehicles (the distance L2 in FIG. 2) in the X-direction, and away from the origin in the Y-direction by 21.7% of the total length of the glass for vehicles (the distance L1 in FIG. 2) in the Y-direction.

In this analysis, a maximum perspective distortion amount was calculated by analysis for models of the example 1 to the example 5. As illustrated in FIG. 16, the perspective distortion amount becomes the maximum in the vicinity of the opening, so that it can be said that the maximum perspective distortion amount indicates a perspective distortion amount in the periphery of the opening. The perspective distortion amount equal to or smaller than 0.2 was accepted.

As illustrated in FIG. 16, the perspective distortion amount is equal to or smaller than 0.2 in the example 1, the example 2, and the example 4. In the example 3 and the example 5, the perspective distortion amount is larger than 0.2. That is, the example 1, the example 2, and the example 4, in which the opening is positioned in the vicinity of the center in the X-direction and the diameter thereof is smaller than 100 mm, are examples, and it can be found that the perspective distortion amount in the periphery of the opening can be kept small. On the other hand, the example 3 and the example 5, in which the opening is positioned to be away from the center in the X-direction and the diameter thereof is large such as 100 mm, are comparative examples, and it can be found that the perspective distortion amount in the periphery of the opening becomes large.

Next, the following describes an example of performing falling ball strength evaluation and thermal image evaluation.

(Preparation of Far-Infrared Ray Transmission Member)

Cylindrical far-infrared ray transmission members (far-infrared ray transmission members A to Q) having different sizes and a far-infrared ray transmission member R having an elliptical shape, which are made of Si, Ge, ZnS, or chalcogenide glass, were prepared. Tables 1 to 3 indicate a material, a diameter L, and a thickness t of each of the far-infrared ray transmission members.

The far-infrared ray transmission member J was made as follows. First, glass raw materials were mixed so that Ga 6.0%, Sb 24.0%, Sn 4.0%, S 62.0%, Cs 2.0%, and Cl 2.0% are achieved in atomic percentage, the glass raw materials were enclosed in a quartz glass tube having an inner diameter of 25 mm, and the temperature thereof was raised to 750° C. to dissolve the glass raw materials for 4 hours. Thereafter, an ingot obtained by rapidly cooling and slowly cooling the dissolved glass was cut together with the quartz glass tube, and polished to obtain the far-infrared ray transmission member J.

Five layers of antireflection films constituted of Ge, Si, and YF$_3$ were applied to a surface on the vehicle exterior side of the far-infrared ray transmission member O, two layers of antireflection films constituted of DLC and Si were applied to a surface on the vehicle exterior side of the far-infrared ray transmission member P and five layers of antireflection films constituted of ZnS and Ge were applied to a surface on the vehicle interior side thereof, and one layer of antireflection film constituted of DLC was applied to a surface on the vehicle exterior side of the far-infrared ray transmission member Q and two layers of antireflection films constituted of ZnS and Ge were applied to a surface on the vehicle interior side thereof, by vapor deposition method.

Additionally, the far-infrared ray transmission member R was constituted of Si to have an elliptic column shape having a minor axis of 36 mm, a major axis of 63 mm, and a thickness of 2 mm, and L described in Table 3 indicates the major axis.

(Measurement of Average Transmittance of Far-Infrared Rays Having Wavelength from 8 to 13 μm)

An infrared transmission spectrum of each of the far-infrared ray transmission members was measured by using a Fourier transform type infrared spectroscopic device (manufactured by Thermo Scientific, product name: Nicolet iS10), and an average transmittance with the wavelength from 8 to 13 μm was obtained from the obtained infrared transmission spectrum. Results are indicated by Tables 1 to 3.

(Manufacture of Window Member)

Example 7

First, laminated glass was prepared by arranging PVB having a thickness of 0.76 mm between pieces of soda-lime glass having a size of 300 mm×300 mm and a thickness of 2.0 mm. Subsequently, a through hole having a diameter of 14 mm was formed to be centered on a point away from the center of the laminated glass toward a side by 100 mm. Subsequently, the far-infrared ray transmission member A was attached to the through hole to be flush with an outer surface by using a urethane-based bonding agent, and the window member of an example 7 was obtained. The urethane-based bonding agent was dried at the ordinary temperature for five days to be hardened.

Examples 8 and 9

The same processing as that in the example 7 was performed except that the diameter of the through hole was set to be 26.5 mm and the far-infrared ray transmission members B and C was respectively attached, and window members of examples 8 and 9 were obtained.

Example 10

The same processing as that in the example 9 was performed except that an acrylic-based bonding agent was used, and a window member of an example 10 was obtained. The acrylic-based bonding agent was dried at 120° C. for one hour, and thereafter dried at the ordinary temperature for five days to be hardened.

Examples 11 to 14

The same processing as that in the example 8 was performed except that the far-infrared ray transmission members D to G were respectively attached, and window members of examples 11 to 14 were obtained.

Example 15

The same processing as that in the example 14 was performed except that an acrylic-based bonding agent was used, and a window member of the example 15 was obtained. The acrylic-based bonding agent was dried at 120°

C. for one hour, and thereafter dried at the ordinary temperature for five days to be hardened.

Examples 16 to 19

The same processing as that in the example 8 was performed except that the far-infrared ray transmission members H to K were respectively attached, and window members of examples 16 to 19 were obtained.

Examples 20 and 21

The same processing as that in the example 7 was performed except that the diameter of the through hole was set to be 51.5 mm and the far-infrared ray transmission members L and M were respectively attached, and window members of examples 20 and 21 were obtained.

Example 22

The same processing as that in the example 7 was performed except that the diameter of the through hole was set to be 91.5 mm and the far-infrared ray transmission member N was attached, and a window member of an example 22 was obtained.

Examples 23 to 25

The same processing as that in the example 7 was performed except that the diameter of the through hole was set to be 51.5 mm and far-infrared ray transmission members O, P, and Q were respectively attached, and window members of examples 23 to 25 were obtained.

Example 26

The same processing as that in the example 7 was performed except that the through hole was caused to have an elliptical shape having a minor axis of 34.5 mm and a major axis of 64.5 mm and a far-infrared ray transmission member R was attached, and a window member of an example 26 was obtained.

(Falling Ball Strength Evaluation)

By using the window members of the examples 7 to 26, the following falling ball strength evaluations 1 and 2 were performed. Examples getting favorable results in both tests were evaluated to be "○", and examples not getting a favorable result in at least one of the tests were evaluated to be "X". Evaluation results are indicated by Table 1 and Table 2. (Falling ball strength evaluation 1)

The evaluation was performed by using a supporting frame and a falling ball device conforming to a shock resistance test of JIS R3211, 3212-2015.

First, the window member was held for four hours in a room in which the temperature is kept at 23° C. and relative humidity is kept at 50°, and fixed by the supporting frame thereafter so that an outer surface thereof faces upward. Subsequently, a steel ball of 226 g was made fall on the center of the window member from a height of 10 m. At this point, a favorable result was assumed to be obtained when the steel ball did not pass through the window member, and total mass of fragments peeled off from an opposite side of an impact surface was equal to or smaller than 15 g.
(Falling Ball Strength Evaluation 2)

The test was performed by performing the same processing as that in the falling ball strength evaluation 1 except that a steel ball of 509 g was used. A favorable result was assumed to be obtained when the far-infrared ray transmission member was not broken or did not come off from the window member, and the total mass of the fragments peeled off from the opposite side of the impact surface is equal to or smaller than 15 g.
(Thermal Image Visibility Evaluation)

Figure 17:
FIG. 17 is a diagram illustrating a thermal image indicating a positional relation with respect to a pedestrian in a test (thermal image visibility evaluation) executed in an example.

By using the window members of the examples 7 to 26, the following thermal image visibility evaluation was performed. FIG. 17 is a diagram illustrating a thermal image indicating a positional relation with respect to a pedestrian in a test (thermal image visibility evaluation) executed in the example.

First, the window member was installed to have an angle α with respect to a horizontal plane. Next, a far-infrared camera (manufactured by Wuhan Guide Infrared Co., Ltd., Cube417 (resolution: 400×300, horizontal viewing angle: 20°, vertical viewing angle: 15°, and focal distance: 19 mm)) was arranged so that a housing thereof is brought into contact with the window member and an optical axis became horizontal and positioned at the center of the far-infrared ray transmission member.

Subsequently, a pedestrian arranged at a distance of 100 m from a window as illustrated in FIG. 17 was photographed by the far-infrared camera at an outside air temperature of 26° C. From an obtained thermal image, 20×30 pixels centered on the pedestrian were cut out, and each thermal image contrast was evaluated with "the highest luminance/ the lowest luminance" by image analysis. As a value of the thermal image contrast is larger, it means that a clearer image is obtained. When the value of the thermal image contrast is equal to or larger than 3.0, the pedestrian 100 m ahead can be sufficiently recognized.

For the window member of the example 7, the test was performed under the condition that α=30°, 60°, and 90°.

For the window members of the examples 8, 11, 13, 16, 18, 19, and 25, the test was performed under the condition that α=30° and 45°.

For the window members of the examples 9, 12, 14, 17, 20 to 24, and 26, the test was performed under the condition that α=30°.

The example 10 and the example 15 were respectively different from the examples 9 and 14 only in a type of the bonding agent, and results of the thermal image visibility evaluation were assumed to be the same, so that the test was not performed. Regarding the window member having an elliptic column shape in the example 26, a minor axis was arranged in the X-axis direction of FIG. 3, and a major axis was arranged in the Y-axis direction.

Tables 1 to 3 indicate a value of a, a value of a diameter R of the largest circle among the circles formed inside the projection drawing obtained by projecting the far-infrared ray transmission member in the optical axis direction, and the value of the thermal image contrast.

TABLE 1

|  |  | Example 7 | Example 8 | Example 9 | Example 10 | Example 11 | Example 12 | Example 13 |
|---|---|---|---|---|---|---|---|---|
| Configuration of far-infrared ray transmission member | Far-infrared ray transmission member | A | B | C | C | D | E | F |
|  | Material | Si | Si | Si | Si | Si | Si | Ge |
|  | L [mm] | 12.5 | 25 | 25 | 25 | 25 | 25 | 25 |
|  | t [mm] | 2 | 1 | 2 | 2 | 3 | 5 | 1 |
|  | Average transmittance [%] | 39 | 47 | 39 | 39 | 33 | 14 | 48 |
|  | Bonding agent | Urethane | Urethane | Urethane | Acrylic | Urethane | Urethane | Urethane |
| Falling ball strength evaluation | Evaluation result | ○ | x | ○ | ○ | ○ | ○ | x |
| Thermal image visibility evaluation | α [°] | 30　60　90 | 30 | 45 | 30 | — | 30　45 | 30 | 30　45 |
|  | R [mm] | 6.3　10.8　12.5 | 12.5 | 17.7 | 12.5 | — | 12.5　17.7 | 12.5 | 12.5　17.7 |
|  | Thermal image contrast | 1.3　2　3.2 | 4.1 | 10.7 | 4.9 | — | 7.7　8.1 | 2.4 | 7.4　11.4 |

TABLE 2

|  |  | Example 14 | Example 15 | Example 16 | Example 17 | Example 18 | Example 19 | Example 20 | Example 21 | Example 22 |
|---|---|---|---|---|---|---|---|---|---|---|
| Configuration of far-infrared ray transmission member | Far-infrared ray transmission member | G | G | H | I | J | K | L | M | N |
|  | Material | Ge | Ge | Ge | Ge | Chalcogenide glass | ZnS | Si | Si | Si |
|  | L [mm] | 25 | 25 | 25 | 25 | 25 | 25 | 50 | 50 | 90 |
|  | t [mm] | 2 | 2 | 3 | 5 | 2 | 3 | 1 | 2 | 3 |
|  | Average transmittance [%] | 47 | 47 | 47 | 45 | 58 | 70 | 47 | 39 | 33 |
|  | Bonding agent | Urethane | Acrylic | Urethane | Urethane | Urethane | Urethane | Urethane | Urethane | Urethane |
| Falling ball strength evaluation | Evaluation result | ○ | ○ | ○ | ○ | ○ | ○ | x | ○ | x |
| Thermal image visibility evaluation | α [°] | 30 | — | 30　45 | 30 | 30　45 | 30　45 | 30 | 30 | 30 |
|  | R [mm] | 12.5 | — | 12.5　17.7 | 12.5 | 12.5　17.7 | 12.5　17.7 | 25.0 | 25.0 | 45.0 |
|  | Thermal image contrast | 6.5 | — | 4.8　11.4 | 5.2 | 4　6.1 | 200　28.2 | 26.5 | 9.9 | 7.8 |

TABLE 3

|  |  | Example 23 | Example 24 | Example 25 | Example 26 |
|---|---|---|---|---|---|
| Configuration of far-infrared ray transmission member | Far-infrared ray transmission member | O | P | Q | R |
|  | Material | Ge | ZnS | Si | Si |
|  | L [mm] | 50 | 30 | 50 | 63 |
|  | t [mm] | 2 | 2 | 2 | 2 |
|  | Average transmittance [%] | 91 | 88 | 68 | 44 |
|  | Bonding agent | Urethane | Urethane | Urethane | Urethane |

TABLE 3-continued

|  |  | Example 23 | Example 24 | Example 25 | | Example 26 |
|---|---|---|---|---|---|---|
| Falling ball strength evaluation | Evaluation result | ○ | ○ | ○ | | ○ |
| Thermal image visibility evaluation | α [°] | 30 | 30 | 30 | 45 | 30 |
|  | R [mm] | 25.0 | 15.0 | 25.0 | 35.4 | 31.5 |
|  | Thermal image contrast | 13.2 | 6.7 | 13.4 | 18.9 | 12.1 |

The following describes results of the falling ball strength evaluation for each example.

In the examples 8, 13, and 20 respectively using the far-infrared ray transmission members B, F, and L having the thickness t of 1 mm, the strength was not a favorable value.

Also in the example 22 using the far-infrared ray transmission member N having the thickness t of 3 mm and the diameter L of 90 mm, the strength was not a favorable value.

On the other hand, in the examples 7, 9 to 12, 14 to 19, 21, and 23 to 26 respectively using the far-infrared ray transmission members A, C to E, G to K, M, and O to R having the thickness t equal to or larger than 1.5 mm and the diameter L equal to or smaller than 80 mm, a sufficiently high strength was obtained.

The following describes results of the thermal image visibility evaluation for each example.

In the test of the example 7 under the condition that α=30° and 60° in which R is respectively 6.3 mm and 10.8 mm, the thermal image contrast was not favorable. On the other hand, in the test of the example 7 under the condition that α=90° in which R is 12.5 mm, sufficient thermal image contrast was obtained.

In the test of the example 12 using the far-infrared ray transmission member E in which the average transmittance of far-infrared rays of a wavelength from 8 to 13 μm is 14°, the thermal image contrast was not favorable.

In all of the tests of the examples 8, 9, 11, 13, 14, and 16 to 26 in which R is equal to or larger than 12 mm, and the average transmittance of far-infrared rays having the wavelength from 8 to 13 μm of the far-infrared ray transmission member is equal to or higher than 25%, sufficient thermal image contrast was obtained.

As is clear from the results described above, high strength and sufficient thermal image contrast was achieved in a case in which the far-infrared ray transmission member has the thickness t equal to or larger than 1.5 mm, the diameter L equal to or smaller than 80 mm, and the average transmittance of far-infrared rays having a wavelength from 8 to 13 μm that is equal to or higher than 25%, and the diameter R of the largest circle among the circles formed inside the projection drawing obtained by projecting the far-infrared ray transmission member in the optical axis direction is equal to or larger than 12 mm.

The embodiment of the present invention has been described above, but the embodiment is not limited thereto. The constituent elements described above include a constituent element that is easily conceivable by those skilled in the art, substantially the same constituent element, and what is called an equivalent. Furthermore, the constituent elements described above can be appropriately combined. In addition, the constituent elements can be variously omitted, replaced, or modified without departing from the gist of the embodiments described above.

REFERENCE SIGNS LIST

1 GLASS FOR VEHICLES
1a UPPER EDGE PART
1b LOWER EDGE PART
1c, 1d SIDE EDGE PART
10, 12, 14 GLASS BASE BODY
16 INTERMEDIATE LAYER
18 LIGHT BLOCKING LAYER
19 OPENING
20 FAR-INFRARED RAY TRANSMISSION MEMBER
100 CAMERA UNIT
A1 TRANSPARENT REGION
A2 LIGHT BLOCKING REGION
B FAR-INFRARED RAY TRANSMISSION REGION
C VISIBLE LIGHT TRANSMISSION REGION
CA1 FAR-INFRARED CAMERA
CA2 VISIBLE LIGHT CAMERA
P1 FIRST POSITION
P2 SECOND POSITION
P3 THIRD POSITION
V VEHICLE

The invention claimed is:

1. Glass for vehicles, the glass comprising a light blocking region, wherein
a far-infrared ray transmission region provided with an opening and a far-infrared ray transmission member arranged in the opening, and a visible light transmission region transmitting visible light are formed in the light blocking region,
the opening is
formed between an upper edge part of the glass and a first position in a first direction from the upper edge part toward a lower edge part of the glass, the first position is a position at which a distance from the upper edge part is 30% of a length from the upper edge part to the lower edge part, and
formed between a second position and a third position in a second direction from one side edge part toward another side edge part of the glass, the second position is closer to the one side edge part than a center of the glass, and the third position is closer to the other side edge part than the center of the glass and a distance from the center is equal to that of the second position, wherein a length from the second position to the third position in the second direction is 55° of a length from the one side edge part to the other side edge part, and
a length of the longest straight line among straight lines connecting optional two points within a surface on a vehicle exterior side of the opening is equal to or smaller than 80 mm.

2. The glass for vehicles according to claim 1, wherein a perspective distortion amount in a periphery of the opening is equal to or smaller than 0.2.

3. The glass for vehicles according to claim 1, wherein a distance between a center of the visible light transmission region and a center of the far-infrared ray transmission region is equal to or smaller than 200 mm.

4. The glass for vehicles according to claim 1, wherein the visible light transmission region and the far-infrared ray transmission region are arranged side by side in the second direction.

5. The glass for vehicles according to claim 1, wherein average transmittance of far-infrared rays having a wavelength from 8 to 13 μm of the far-infrared ray transmission member is equal to or larger than 25%.

6. The glass for vehicles according to claim 1, wherein the far-infrared ray transmission member includes at least one material selected from the group consisting of ZnS, Ge, Si, and chalcogenide glass.

7. The glass for vehicles according to claim 1, wherein at least one of a surface on a vehicle exterior side and a surface on a vehicle interior side of the far-infrared ray transmission member includes 1 to 12 layers of antireflection films, and a layer closest to the vehicle exterior side among the antireflection films on the vehicle exterior side is a diamond-like carbon film.

8. The glass for vehicles according to claim 1, wherein a surface on the vehicle exterior side of the far-infrared ray transmission member is formed to be continuous to a surface on the vehicle exterior side of the light blocking region.

9. The glass for vehicles according to claim 1, wherein the far-infrared ray transmission member is attached with at least one of a urethane-based bonding agent and an acrylic-based bonding agent.

10. The glass for vehicles according to claim 1, wherein an area of the opening on a surface on the vehicle interior side is smaller than an area of the opening on a surface on the vehicle exterior side.

11. The glass for vehicles according to claim 1, wherein the glass for vehicles is configured to be mounted on a vehicle including a far-infrared camera and a visible light camera, a diameter of the largest circle, among circles formed inside a projection drawing obtained by projecting the far-infrared ray transmission member in an optical axis direction of the far-infrared camera, is equal to or larger than 12 mm, and an average thickness of the far-infrared ray transmission member is equal to or larger than 1.5 mm.

12. A camera unit comprising:
the glass for vehicles according to claim 1;
a far-infrared camera; and
a visible light camera, wherein
the far-infrared camera is mounted on the glass for vehicles so as to be able to take a thermal image of the outside through the far-infrared ray transmission region, and the visible light camera is mounted on the glass for vehicles so as to be able to take an image of the outside through the visible light transmission region.

13. The camera unit according to claim 12, wherein an optical axis of the far-infrared camera is substantially parallel with an optical axis of the visible light camera, and a distance between the optical axis of the far-infrared camera and the optical axis of the visible light camera is equal to or smaller than 200 mm.

14. The camera unit according to claim 12, comprising:
a first visible light camera and a second visible light camera as the visible light camera, wherein
the far-infrared camera is positioned between the first visible light camera and the second visible light camera.

15. The camera unit according to claim 12, comprising:
a first far-infrared camera and a second far-infrared camera as the far-infrared camera, wherein
the visible light camera is positioned between the first far-infrared camera and the second far-infrared camera.

16. The camera unit according to claim 12, wherein the far-infrared camera is mounted on the glass for vehicles via a bracket, and an inner part of the bracket is kept vacuumed or an insulating material is filled in the inner part of the bracket.

17. The camera unit according to claim 12, wherein the far-infrared camera is mounted on the glass for vehicles via a bracket, and further includes a temperature regulator for adjusting a temperature within the bracket.

* * * * *